March 7, 1967 E. L. ERWIN 3,308,242

SWITCHING SYSTEM MINIMIZING TRAFFIC BETWEEN SWITCH FRAMES

Filed Dec. 30, 1963 14 Sheets-Sheet 1

INVENTOR
E. L. ERWIN
BY
S E Hollander
ATTORNEY

March 7, 1967 E. L. ERWIN 3,308,242

SWITCHING SYSTEM MINIMIZING TRAFFIC BETWEEN SWITCH FRAMES

Filed Dec. 30, 1963 14 Sheets-Sheet 2

March 7, 1967 — E. L. ERWIN — 3,308,242

SWITCHING SYSTEM MINIMIZING TRAFFIC BETWEEN SWITCH FRAMES

Filed Dec. 30, 1963 — 14 Sheets-Sheet 3

March 7, 1967 E. L. ERWIN 3,308,242

SWITCHING SYSTEM MINIMIZING TRAFFIC BETWEEN SWITCH FRAMES

Filed Dec. 30, 1963 14 Sheets-Sheet 5

March 7, 1967 E. L. ERWIN 3,308,242

SWITCHING SYSTEM MINIMIZING TRAFFIC BETWEEN SWITCH FRAMES

Filed Dec. 30, 1963 14 Sheets-Sheet 6

March 7, 1967 E. L. ERWIN 3,308,242

SWITCHING SYSTEM MINIMIZING TRAFFIC BETWEEN SWITCH FRAMES

Filed Dec. 30, 1963 14 Sheets-Sheet 11

March 7, 1967 E. L. ERWIN 3,308,242

SWITCHING SYSTEM MINIMIZING TRAFFIC BETWEEN SWITCH FRAMES

Filed Dec. 30, 1963 14 Sheets-Sheet 12

3,308,242

SWITCHING SYSTEM MINIMIZING TRAFFIC BETWEEN SWITCH FRAMES

Edson L. Erwin, Towaco, N.J., assignor, by mesne assignments, to Bell Telephone Laboratories, Incorporated, New York, N.Y., a corporation of New York Filed Dec. 30, 1963, Ser. No. 334,353
19 Claims. (Cl. 179—18)

This invention relates to communication systems and particularly to the networks and controls employed therein for interconnecting a plurality of incoming circuits with a plurality of outgoing circuits for communication purposes.

In a particular aspect this invention relates to switching networks serving a plurality of incoming and outgoing circuits and arrangements for interconnecting the circuits in a variety of ways.

In a more particular aspect this invention relates to switching systems serving a plurality of communication circuits conveniently divided in two groups wherein circuits to be interconnected are selected on a preferential basis to confine the connection within the particular group thereby minimizing traffic and connections between different circuit groups.

In a very particular aspect this invention relates to crossbar switching systems having groups of primary switches with both incoming and outgoing circuits terminated thereon and having secondary switches for interconnecting the primary switches of a group and of different groups and wherein means are provided to effect the interconnection of incoming and outgoing circuits using the least number of switches.

Various communication systems have heretofore been employed for interconnecting any one of a plurality of calling lines or incoming circuits with any one of a plurality of called lines or outgoing circuits. It will be understood that the terms, calling line and incoming circuit as employed herein, signify any communication circuit requesting a connection through the switching system. Such incoming circuits may include subscriber lines over which customers originate calls, incoming trunks from a distant switching center over which calls from the distant center are received, etc. On the other hand, the terms called line and outgoing circuit as used herein, will signify circuits to which a connection is requested. Such outgoing circuits may include registers, outgoing trunks over which calls to a distant switching center are forwarded, special service trunks, etc.

Of the various switching systems known, some employ crossbar switches wherein the incoming circuits appear on one coordinate of a crossbar switch and the outgoing circuits appear on the other coordinate. With these arrangements, sometimes referred to as "direct access" systems, any incoming circuit can be connected to any outgoing circuit by actuating their corresponding coordinates on the crossbar switch. This arrangement, while wholly suitable for small networks, offers serious problems as the networks grow, due in part, to the limited number of circuits that can be terminated on a particular crossbar switch. More specifically, once the circuit capacity of a given switch is exceeded and new crossbar switches must be added to accommodate new circuits, arrangements will have to be made for the existing circuits to be multipled to the new switches so as to provide access from existing circuits to the newly added circuits.

To alleviate this problem, systems have been proposed wherein all incoming and outgoing circuits appear on the same coordinate, such as the verticals, of a crossbar switch and the horizontals are used as common links to interconnect any two verticals. With this arrangement each circuit need only appear on one switch, and the links can be multipled to all other switches to provide access from every incoming circuit to all outgoing circuits. It readily becomes obvious, however, that this system has a limited traffic capacity based on the number of links available, since these links are used by all circuits for every type of call.

It is, therefore, one object of my invention to increase the circuit capacity of switching systems without the cumbersome multiple appearances of circuits or links.

Other switching systems are also well known wherein the circuits are divided into two classes, each class appearing on one type of network frame. These systems are found where a large number of communication circuits must be served, and the circuits are generally divided into subscriber lines, which terminate on the primary switches of line link frames, and all other circuits, such as originating registers, outgoing trunks and incoming trunks, which terminate on the primary switches of trunk link frames. Between the line link frame primary switches and the trunk link frame primary switches, several secondary switching stages may be interposed, permitting the interconnection of any subscriber line circuit with any register or trunk circuit on any trunk link frame primary switch.

While the increased number of switching stages provides more circuit capacity over direct access systems without the problems accompanying the use of multiple appearances, systems such as the one described generally have a fixed ratio of line link frames to trunk link frames to facilitate the arrangement of junctors between the frames. In other words, to care for additional subscriber line circuits, more line link frames are added to a system, and because of the equipment limitations, trunk link frame capacity must also be added whether or not trunks and register circuits are needed. Thus, because of the arbitrary division of communication circuits between the line link and trunk link frames and other equipment limitations, equipment must be furnished before it is actually needed resulting in a considerable, premature capital outlay.

It is, therefore, another object of my invention to improve switching systems by having only one variety of network frame to serve all types of incoming and outgoing communication circuits.

Although the systems mentioned above generally employ bidirectional networks, other systems are known wherein unidirectional networks are used, that is to say, networks wherein calls can only be established in one direction. Subscriber lines must, therefore, terminate in at least two networks, one having incoming trunks terminated therein and the other providing terminations for outgoing trunks.

During their formative stages, these systems must necessarily be provided with at least one network switching frame, or other equipment unit, for each type of circuit to be terminated. As the systems grow and subscriber lines are added, line switch frames must be furnished in both the originating and terminating networks, and additional incoming and outgoing trunk switch frames must be furnished to handle the traffic offered by the new subscriber lines. Furthermore, the necessary links and junctors interconnecting all of the switching frames must be provided since all calls are generally completed between two or more switching frames.

Another object of my invention, therefore, is to facilitate the solution of problems appurtenant to orderly growth in a switching system.

Also, as with the last mentioned system, each frame has a limited number of outlets or junctors to serve calls to all other frames, and connections are always established between a line link frame and a trunk link frame using one or more of these junctors. As the system grows and more frames are added, the existing junctors must be rearranged and "spread out" to serve the new frames resulting in a decrease in the number of junctors between a given line link frame and trunk link frame. It is also desirable during these junctor rearrangements to redistribute trunks and register circuits so that the circuits in any one group appear on as many different trunk link frames as possible thereby affording greater junctor access to the trunk or register group as a whole.

The rearrangement of circuits to balance the system by distributing the traffic more evenly, operates on the theory that all subscribers should be afforded the same opportunity of access to all trunk and register circuits. In reality, certain groups of subscribers may have different communities of interest, thus using certain commonly available circuits more frequently than they use other circuits. It would be advantageous, therefore, to provide these customers with more circuits of the type most frequently used, or a more direct access to the circuits that are provided, while still permitting other customers, who use these circuits less frequently, to use the circuits over less direct paths.

It is, therefore, another object of my invention to provide an improved switching system wherein connections between incoming and outgoing communication circuits can be established over direct paths wholly within an equipment unit without using outlets or junctors to other equipment units.

In accordance with one specific embodiment of my invention, a crossbar switching system having only one variety of network frame is employed in a telephone system. The network frames comprise primary crossbar switches and secondary or junctor crossbar switches. All incoming and outgoing communication circuits such as subscriber lines, incoming trunks, outgoing trunks, register circuits, etc., appear on the verticals of the primary switches, and the horizontals of the primary switches in each frame are connected over links to the verticals of the secondary switches on the same frame. Junctors are furnished to interconnect the horizontals of secondary switches on different frames thereby enabling any incoming circuit to be connected to any outgoing circuit by using the appropriate links and junctors. Connections, which can be established in a variety of ways, are controlled by common equipment including a marker.

When an incoming circuit such as a subscriber line originates a call, the marker is informed that the line desires connection to a dial tone register. The marker then tests for an idle register on an idle network frame and connects the calling line to the register using the appropriate links and junctors.

More specifically, and in accordance with one aspect of my invention, the marker circuit, upon recognizing a request for a dial tone register, identifies the group of lines (i.e., the network frame) and the particular subgroup (i.e., the primary switch) in which the incoming line requesting service is located. The marker then proceeds to select an idle outgoing circuit, and specifically a dial tone register, in a special manner giving first preference to registers that may appear in the same line group and the same subgroup as the calling subscriber's line. If one of these registers is idle the marker can then connect the subscriber line and the register circuit right at their common subgroup primary switch by operating a horizontal select bar and two hold magnets, one hold magnet being associated with the subscriber's line and the other being associated with the register. Thus, an incoming circuit and an outgoing circuit are connected at a single switch without using the links, junctors or secondary switches.

If the first choice registers appearing on the same primary switch as the calling subscriber are busy, the marker will then attempt to select an idle register from those registers which are on the same network frame as the calling line but on different primary switch subgroups. Upon finding one of these lesser preferred registers available, the marker can then interconnect the subscriber line and the register by utilizing only the linkage on the particular network frame. This is accomplished by interconnecting two links (one link serving the primary switch of the register and the other link serving the primary switch of the subscriber line) over a common horizontal on one of the junctor switches of the frame. Thus, although using a lesser preferred register, the circuits are connected within a network frame without using any outlets or junctors.

On the other hand, if there are no idle registers on the same frame as the line requesting service, the marker can select an idle register on any frame in the system and interconnect the subscriber's line to the register circuit using a link on each frame and a junctor between the two frames.

The same sequence of testing and selecting circuits will be performed for other calls, such as a subscriber line requesting service to an outgoing trunk, an incoming trunk requesting service to an outgoing trunk, etc.

Thus, it can readily be seen that in systems employing my invention connections are established between incoming and outgoing circuits over the shortest available network paths by first attempting to complete the connection within a single primary switch, but if idle circuits are unavailable on the same switch, by attempting to complete the connection within a single network frame. Moreover, if the connections cannot be completed within a switch or network frame a further attempt is made to complete the call regardless of the switch and frame location of the idle circuits.

Furthermore, since there is virtually no restriction on the assignment of circuits to particular network terminations and connections can be established in a variety of ways using only portions of the network, a complete system requiring only one network frame or only a portion of a frame may be sufficient for a given traffic situation. As the network expands and more switches are added to the frame (or more frames are added), the common control equipment readily adjusts to the expanded network by virtue of its ability to select all or only portions of the network for circuit connections.

One feature of my invention, therefore, resides in a multistage switching system wherein all incoming and outgoing circuits terminate in the same stage of switching.

A further feature of my invention resides in a switching network wherein connections can be established between incoming and outgoing circuits in a distinct variety of ways.

A more specific feature of my invention is found in a switching system having incoming and outgoing circuits terminated in a first switching stage wherein the circuits are divided into groups and wherein means are provided for preferring interconnection of circuits within a group.

Another feature of my invention is found in a switching system having network frames with lines and trunks terminated thereon, wherein each network frame can function as a line link frame and as a trunk link frame, wherein means are provided for identifying the network frames and wherein network frames are selected as line link and trunk link frames for interconnection in a varying sequence in accordance with the identity of the frames to be interconnected.

A still more specific feature of my invention resides in a switching system comprising primary switches having incoming and outgoing circuits terminated thereon, and secondary switches, wherein the switches are divided into frame groups and wherein means are provided for establishing interconnections between circuits in a rank order by first attempting to interconnect two circuits at the same primary switch, secondly, attempting to interconnect two circuits on different primary switches within the same frame group and thirdly, by attempting to interconnect circuits on different primary switches in different frame groups.

These and other objects and features of my invention will become readily apparent from the following description with respect to the drawing, in which.

GENERAL DESCRIPTION

Figure 1:
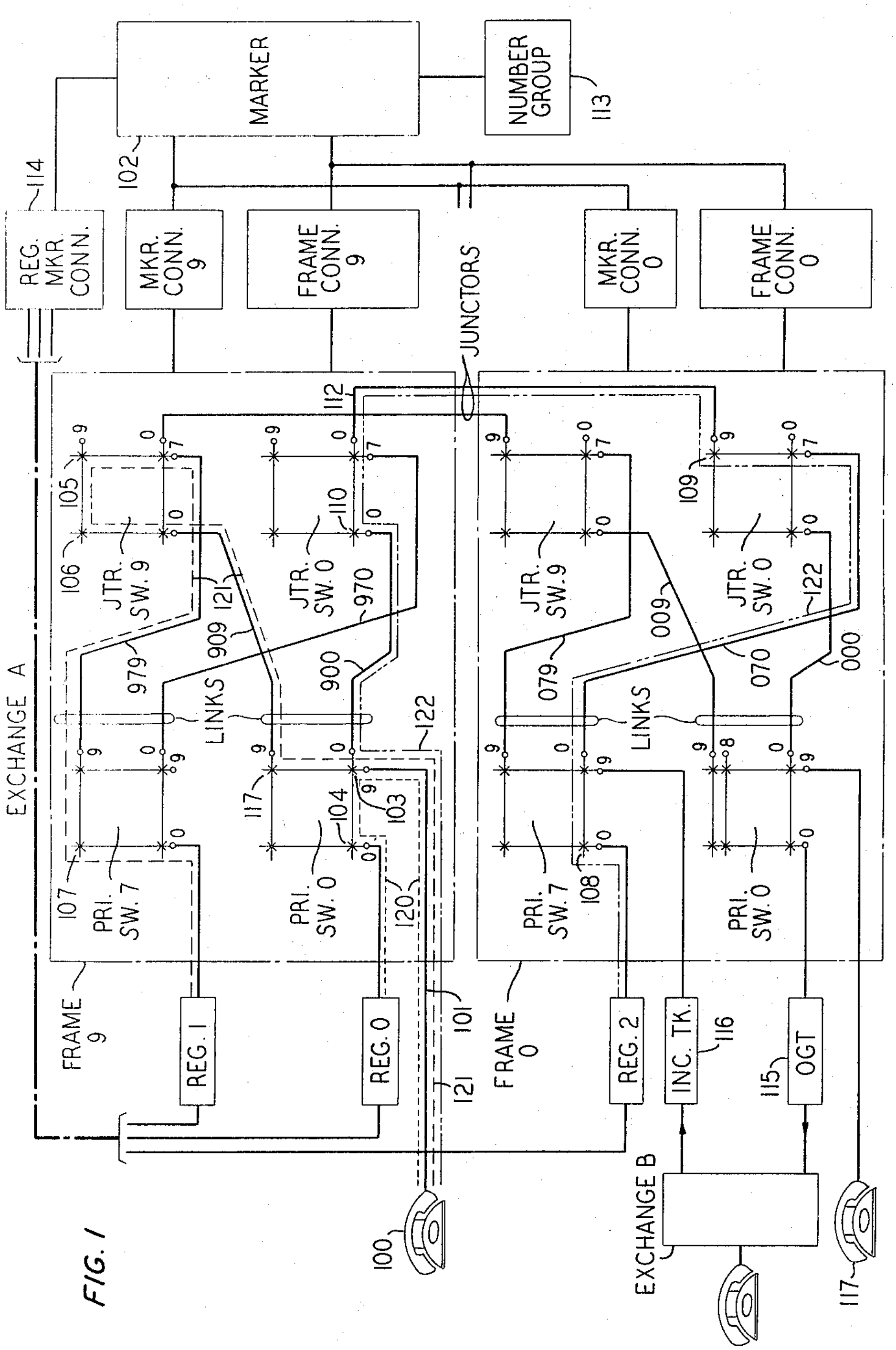
FIG. 1 depicts one illustrative embodiment of the invention in a telephone switching system which is represented in block diagram form.

Before describing the invention in specific detail, a brief description of the arrangement will be given with reference to the block diagram in FIG. 1 of the drawing to permit the reader to first gain an over-all understanding of the arrangement contemplated.

*Arrangement of components*

Turning now to FIG. 1 there is shown a telephone system comprising two central office exchanges designated Exchange A and Exchange B. While Exchange B can employ any type of switching equipment, Exchange A, which is shown in more detail, employs only one type of network frame for serving all incoming and outgoing communication circuits.

As mentioned above, the term, calling line or incoming circuit, as used herein signifies any communication circuit requesting service at the switching center. These incoming circuits might include subscriber lines, incoming trunks, etc. On the other hand, the term called line or outgoing circuit, as used herein, is used to describe communication circuits to which service is requested such as registers, outgoing trunks, special service trunks, etc.

Two of the network frames, designated frame 0 and frame 9, are shown and they each include a plurality of crossbar switches which are divided into two switching stages, primary switches and secondary or junctor switches. While the type and quantity of switches employed in the network may vary with traffic and equipment requirements, for this illustrative embodiment of the invention, crossbar switches, which are well known in telephone switching, will be used and the frames will be arranged with the eight primary crossbar switches and ten junctor crossbar switches.

All incoming and outgoing circuits appear on the primary switch verticals, and the horizontals of the primary switches are connected over links to the verticals of the junctor switches within each network frame. The links are arranged so that each primary switch is connected to each junctor switch within the network frame, however, depending on the size of the switch used, certain primary switch horizontals e.g., horizontal 8 on primary switch 0 of frame 0, need not be connected by links to the junctor switches.

The horizontals of the junctor switches on a particular network frame are connected over junctors to junctor switch horizontals of all other network frames, and the number and arrangement of junctors will, of course, depend on the capacity of the junctor switch and the total number of network frames in a given system.

In this specific embodiment of the invention, Exchange A has ten network frames and therefore, each frame is connected over junctors to nine other network frames. Those junctor switch horizontals that are not connected to other frames via junctors, such as horizontal 0 on the junctor switches of frame 0 are left unterminated and can advantageously be used for intraframe connections not requiring a junctor as will be discussed below.

All switching operations are under control of common markers, such as marker 102, to which connections are made by a variety of connectors. Each frame has an individual marker connector and a frame connector, the marker connector operating under control of the frame to gain access to the marker for a line requesting service and the frame connector being operated under control of the marker to connect the marker to a frame for stablishing network connections.

Registers, such as registers 0–2 are used for registering called line designations as they are received over subscriber lines and incoming trunks. These registers may be equipped to receive any type of pulsing, such as multifrequency or dial pulses, and upon the receipt of the address code of the called line, the register gains access to a marker via a register marker connector to forward this information to the marker to permit the marker to establish the desired connection.

To assist the marker a plurality of number group circuits are provided which translate the numerical designation of the called line into the location of the called line on a network frame.

Other common control equipment, test equipment, message billing equipment, etc., may also be provided in the system, but this equipment has not been shown, and the description of this equipment need not be given herein for a full understanding of my invention.

In order for the reader to fully appreciate certain features of my invention a brief description will now be given with respect to the establishment of typical calls in the system.

*Originating calls*

When a subscriber, such as subscriber 100 in FIG. 1 desires to initiate a call, he lifts his telephone receiver and signals over a subscriber line 101 requesting dial tone. Subscriber line 101 is connected to network frame 9, and frame 9, upon recognizing a request for dial tone, seizes marker 102 via marker connector 9 and informs marker 102 that there is an incoming circuit (subscriber line 101) requesting dial tone at frame 9.

Marker 102 identifies the location of the line requesting the dial tone connection and proceeds to select an idle dial pulse register. In accordance with one feature of my invention, marker 102 will select a register for line 101 based on the particular frame and switch location of line 101 so that the shortest available connection through the network is utilized.

More specifically, the marker 102 will first test for an idle register on the same frame or in the same group of circuits as the line requesting service. If registers, such as register 0 and register 1 are idle and frame 9 is idle, marker 102 will seize frame 9 through frame connector 9. Having previously identified the primary switch and vertical termination of line 101, marker 102 looks for an idle dial pulse register on frame 9 and prefers the selection of register 0, if idle, since register 0 is on the same primary switch or subgroup of circuits as subscriber line 101. With both subscriber line 101 and register 0 on the same primary switch and on the same network frame, a connection can be established between the line and register right at the primary switch exclusive of any links or junctors. This is accomplished under control of marker 102 by operating a select bar on the primary switch 0 of frame 9 and then operating a vertical hold magnet associated with calling line 101 and vertical hold magnet associated with selected register 0 to close two sets of crosspoints to the same horizontal. This path is shown by the dotted line 120 adjacent to the path which connects subscriber line 101 with register 0, and the path is completed by closing crosspoints 103 and 104 to the horizontal 0 on primary switch 0 for frame 9. While all of the primary switch horizontals are shown connected over links to junctors switches, certain of the primary switch horizontals may be left unterminated for calls to be completed within a switch.

If all of the dial pulse registers on primary switch 0 of frame 9 are busy, marker 102 would attempt to select an idle register on a different primary switch but within the same network frame as the line requesting service.

Register 1 if available, might be selected and connected to line 101 wholly within network frame 9 using two links interconnected (exclusive of any junctors) by a junctor switch horizontal common to the two links, and of course, the marker can select an idle junctor switch horizontal in the same manner that it would select an idle junctor if a junctor were to be used on the call. More specifically, links 909 and 979 could be interconnected by first operating the ninth level select bar on junctor switch 9 of frame 9 and then operating the vertical hold magnets on junctor switch 9 associated with links 909 and 979. A path adjacent to the dashed line 121 would then be completed from subscriber 100 over line 101, through crosspoints 117 on primary switch 0 of frame 9, over link 909, through crosspoints 106, over horizontal 9 of junctor switch 9, through crosspoints 105, over link 979 and through crosspoints 107 to register 1 on vertical 0 of primary switch 7 of frame 9.

It will be noted that horizontal 9 of junctor switch 9 was advantageously used on this intraframe connection since this horizontal is not connected via a junctor to another network frame. If, however, the unterminated junctor horizontals are all busy an intraframe traffic, any of the other junctor horizontals could be used for the intraframe connection, and under these circumstances the junctor connected to the horizontal would be ineffective on the connection.

Upon recognizing a busy condition on all registers located on the same network frame as the line requesting service, marker 102 will attempt to select an idle register on any other frame in the system and connect subscriber line 101 with the idle register using a link on each network frame and a junctor between the two frames. For instance, if register 2 on frame 0 in FIG. 1 is found idle, line 101 on frame 9 could be connected to register 2 over the path adjacent to the dash-dot line 122 using crosspoints 103 on primary switch 0 of frame 9, link 900 on frame 9, crosspoints 110 on junctor switch 0 of frame 9, junctor 112 to frame 0, crosspoints 109 on junctor switch 0 of frame 0, link 070 on frame 0 and crosspoints 108 on primary switch 7 of frame 0.

After subscriber 100 is connected to a dial tone register such as register 0, the marker primes the register with the calling line location and releases leaving the calling customer connected to the register. The calling customer then dials the called line number which is registered in register 0, and after sufficient digits have been registered in the register, register 0 seizes marker 102 via register marker connector 114 and forwards the calling line information and the called line number to the marker to enable marker 102 to establish a connection to a called line in accordance with the number dialed.

If the called number is served by a distant exchange, such as Exchange B, marker 102 would test for idle trunks, such as trunk 115, in the proper trunk route to Exchange B. The selection of an idle outgoing trunk is accomplished in the same manner as that described above with respect to the selection of a register on a dial tone call by first preferring those outgoing trunks in the proper route which terminate on the same network frame and primary switch as the calling subscriber, giving second preference to those outgoing trunks on the same network frame but on different primary switches and finally selecting those outgoing trunks which appear on different network frames.

*Other calls*

For called numbers within Exchange A marker 102 utilizes a number group such as number group 113 to ascertain the called line primary switch and network frame identification and completes the call over an intraoffice trunk. Intraoffice trunks have not been shown in FIG. 1, but these trunks have two appearances in the primary switch field. One appearance, for the calling subscriber, is similar to an outgoing trunk while the other appearance, for the called subscriber, is similar to an incoming trunk.

When incoming trunks such as trunk 116 from Exchange B are seized at their originating office they are connected to a register circuit in the same manner as a subscriber line originating a dial tone call, and if Exchange A is used as a tandem office, i.e., for calls which switch through to another distant exchange, the incoming trunk is connected to an outgoing trunk similar to a subscriber line placing a dial tone or outgoing call. In accordance with certain features of my invention, the selection of the register and outgoing trunk for connection to the incoming trunk utilizes the aforementioned techniques whereby the circuits are selected in a preferential order based on the network frame and primary switch location of the incoming trunk circuit.

Thus, it can be seen that connections between incoming circuits and outgoing circuits are established in a variety of ways over the network, and by preferential selection of circuits, the shortest network path is utilized thereby minimizing traffic and connections between network frames and between different switches on the same network frame.

DETAILED DESCRIPTION

Figure 14:
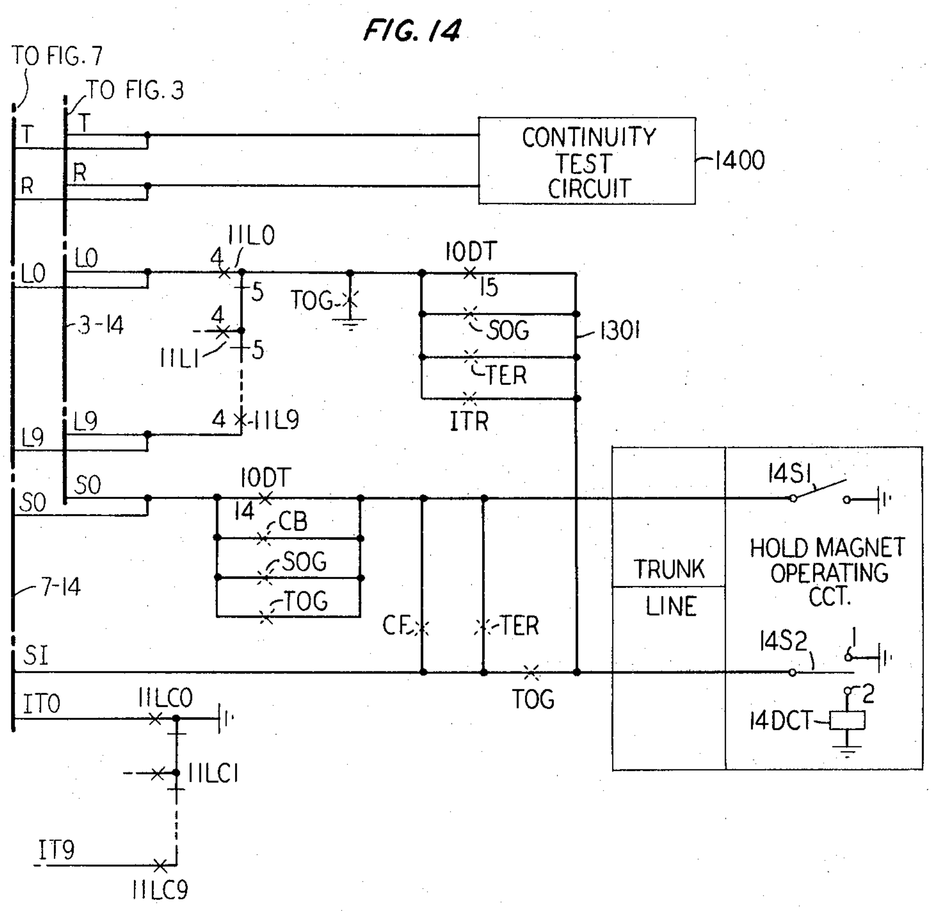
Figure 15:
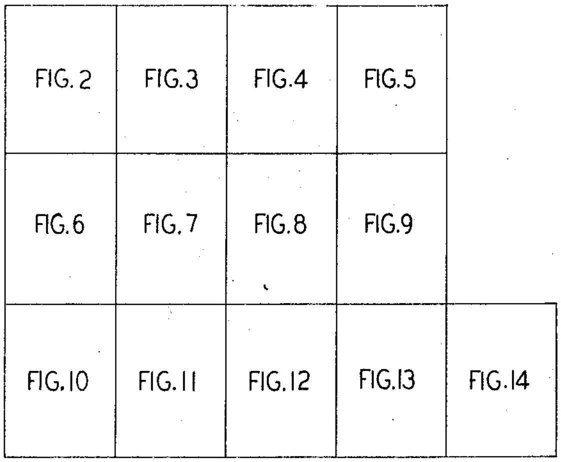
FIG. 15 shows the arrangements of FIGS. 2–14.

Turning now to FIGS. 2–14 when arranged in accordance with FIG. 15 there is shown a more detailed schematic representation of one embodiment of the invention employed in the telephone system depicted in the block diagram of FIG. 1.

FIGS. 2–5 show network frame 9, its associated frame connector 9, marker connector 9 and various incoming and outgoing communication circuits terminated on frame 9.

FIGS. 6–9 show network frame 0, its associated frame connector 0, marker connector 0 and various incoming and outgoing communication circuits terminated on frame 0.

FIGS. 10–14 depict a portion of a marker circuit and related common equipment such as register marker connector 114 and number group 113.

While the elements essential for a full understanding of the invention have been disclosed in the drawing, to afford clarity, some of the circuitry which is well known in the art has been simplified therein. Typical examples of the simplified circuitry are disclosed in more detail in Patent 2,585,904 granted to A. J. Busch of February 19, 1952, and it is to be understood that the aforementioned Busch patent is hereby incorporated by reference as though fully disclosed herein. The contacts of certain relays are represented in the drawing by dotted lines. Since the function of these relays is so well known, their windings have been omitted from the instant drawing, and it is to be understood that relays similar to those not shown can be found in the aforementioned Busch patent.

In the detailed circuits of FIGS. 2–14 the equipment has been given letter designations representative of their functional characteristics, and the lettered designation is generally preceded by a number which indicates the figures in which the equipment is located. Conductors have been given numerical designations and, where possible, letter designations representative of their functional characteristics. Where several conductors are grouped in a cable, the cables in general have been given a designation made up of the numbers of the two figures between which the cable extends separated by a hyphen. Where possible, cables have been extended directly between adjacent figures, but where a cable extends between nonadjacent figures, the figure to which the cable extends is noted on the drawing.

*Originating call—dial tone connection*

When a customer at station 100 in FIG. 1 initiates a call, the removal of the receiver at the substation completes a circuit for operating a subscriber line relay 2L in line circuit 101. The operating circuit for relay 2L can be traced from battery through the winding of relay 2L, over conductor 200, through normal contacts 2 of primary hold magnet 4PHM09, over ring conductor 201, through switchhook contacts (not shown) at station 100, and back over tip conductor 202 to ground through the normal contacts 1 of hold magnet 4PHM09. Relay 2L, in operating, closes its contacts 1 to extend ground over conductor 203 to battery through the winding of start relay 2ST thereby operating start relay 2ST. Start relay 2ST is common to all line relays on frame 9, and when operated, relay 2ST indicates a request for service by one of the incoming circuits terminated on frame 9.

When relay 2ST operates, it extends battery from resistance 2R, through its contacts 1, and over conductor 204 to marker connector 9 to prepare for the selection of an idle marker.

Each network frame has an associated marker connector comprising multicontact relays for each marker and a control circuit. Operation of a multicontact relay connects the network frame with an associated marker, and the multicontact relays are operated by the control circuit which permits the frame to seize control of an idle marker and prevent other frames from seizing the same marker. If it is assumed that the marker is idle, its associated connector busy relay 2CB (not shown) will be released, and battery on conductor 204 from frame 9 will be extended through contacts 1 of relay 2CB and through the winding of marker preference relay 2MP to ground, operating relay 2MP. Relay 2MP, in operating, extends ground from its contacts 1, through normal contacts of other MP– relays (not shown) and through the winding of multicontact relay 2MC to battery operating relay 2MC. Multicontact relay 2MC in operating closes through a plurality of contacts for associating network frame 9 with marker 102.

*Preparation of marker*

When multicontact relay 2MC operates a circuit is completed for operating class of call relay 10DT in the marker to inform the marker that a dial tone request has been received. This circuit can be traced from ground through contacts 6 of relay 2MC, over conductor 207 in cable 2–10 to FIG. 10 and through the winding of relay 10DT in FIG. 10 to battery, operating relay 10DT.

Relay 10DT, in operating, closes its contacts 1 to complete an obvious operating circuit for relay 10ON in FIG. 10, and marker off-normal relay 10ON closes through a plurality of circuits the functions of which will be discussed below.

*Identification of calling line*

Figure 10:
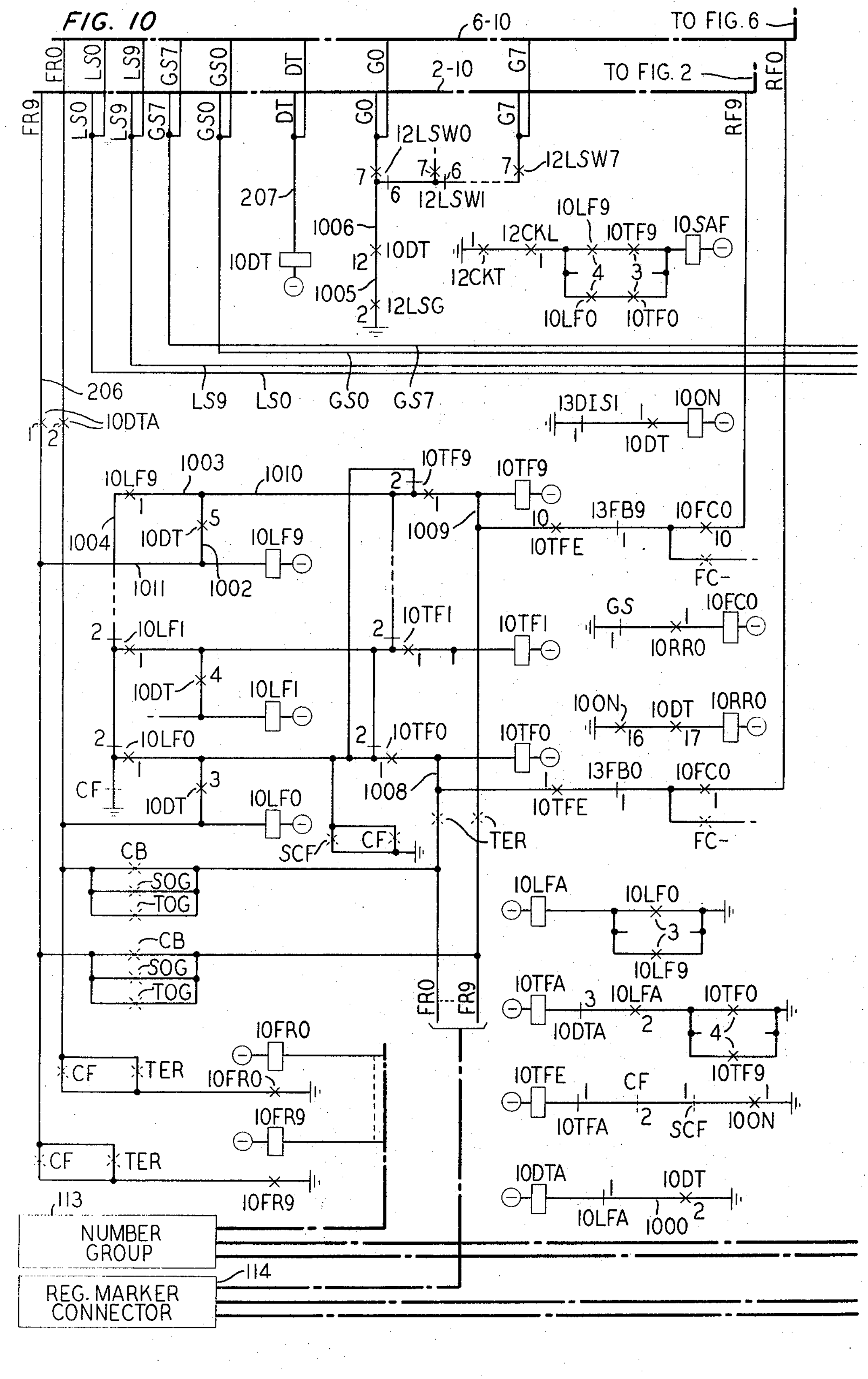

Relay 10DT, in operating, also closes its contacts 2 in FIG. 10 to extend ground over conductor 1000, through contacts 1 of relay 10LFA and through the winding of auxiliary dial tone relay 10DTA to battery, operating relay 10DTA. Relay 10DTA, in operating, closes through a plurality of frame identification leads (FR–) to the windings of line frame relays 10LF– in the marker for the purpose of identifying on which frame the line requesting a dial tone connection is located.

In the assumed example, a subscriber on frame 9, has requested dial tone and therefore, ground is extended from contacts 2 of relay 2ST on frame 9 (FIG. 2) over conductor 205, through contacts 1 of relay 2MC, over conductor 206 in cable 2–10 to FIG. 10, through operated contacts 1 of relay 10DTA, over conductor 1011 and through the winding of relay 10LF9 to battery, operating relay 10LF9. Relay 10LF9 operates indicating that the frame requesting service is frame 9, and relay 10LF9 locks over a circuit traced from battery through its winding, over conductor 1002, through contacts 5 of relay 10DT, over conductor 1003, through contacts 1 of relay 10LF9, over conductor 1004 and through contacts 2 of all other 10LF– relays normal to ground through contacts 1 of relay CF.

When relay 10LF9 operated it also closed its contacts 3 to complete an obvious operating circuit for relay 10LFA, in FIG. 10 and when relay 10LFA operates, it interrupts the operating circuit for previously operated relay 10DTA which releases. Relay 10DTA in releasing disconnects the frame identification leads (FR–) from the windings of the 10LF– relays to prevent any further operation of these relays.

Figure 12:
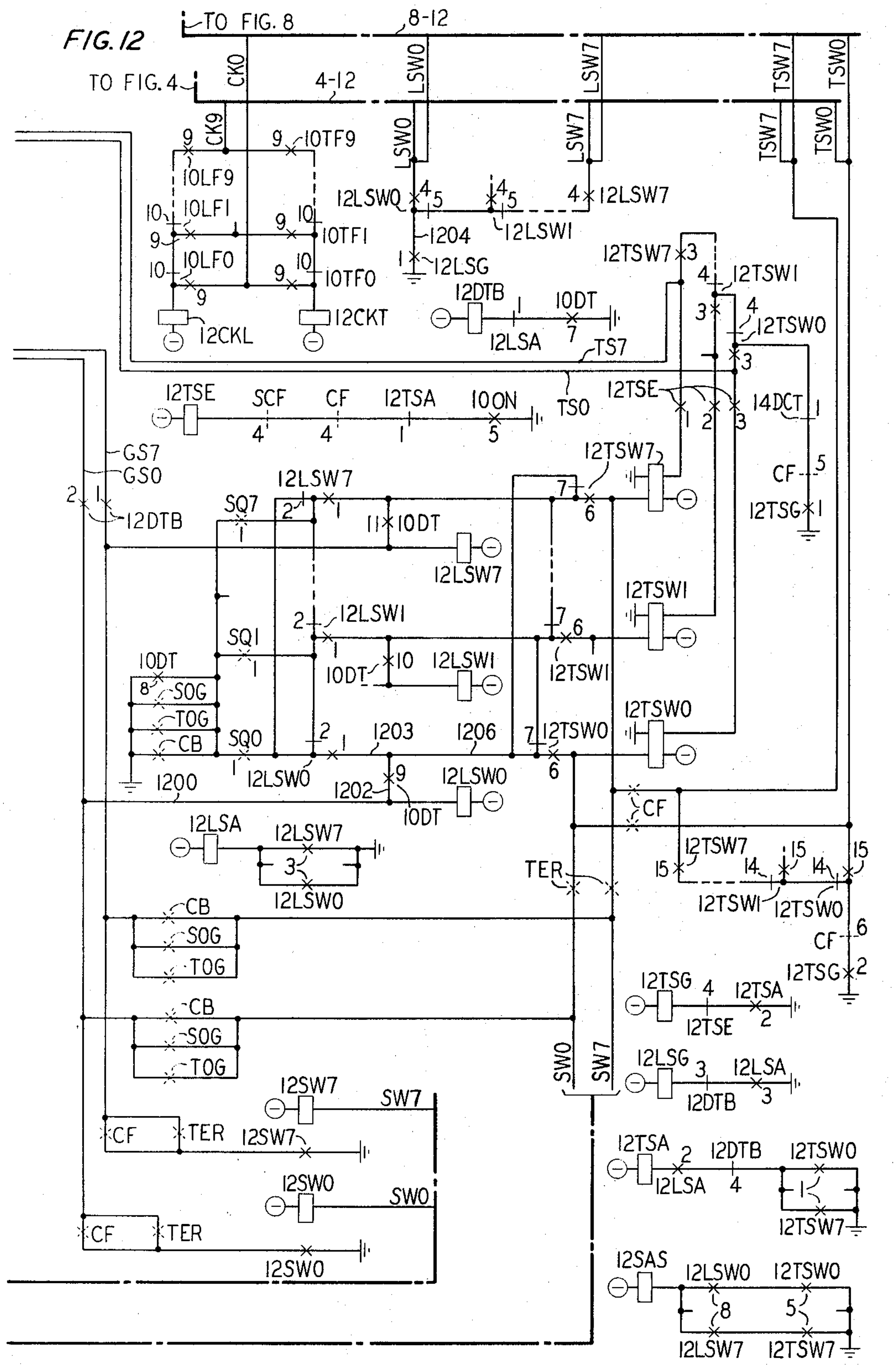

Turning now to FIG. 12, when dial tone class relay 10DT operated as described above, it closes its contacts 7 to extend a ground through normal contacts 1 of relay 12LSA and through the winding of relay 12DTB, to battery thereby operating relay 12DTB. Relay 12DTB, in operating closes through a plurality of GS– leads from the network frame to the windings of line switch identification relays 12LSW– in the marker for the purpose of identifying the particular primary switches on which lines are requesting service. Since many subscribers on different primary switches of frame 9 may have initiated calls simultaneously, several of the 12LSW– relays in the marker may operate. In that event, however, only one 12LSW– relay will be preferred and this is accomplished under the control of a sequence circuit.

While the complete details of the sequence circuit are not disclosed herein, means are provided in the marker for sequentially advancing the preference to different switches and different lines on the successive calls. Briefly, the sequence circuit comprises a plurality of SQ– relays and a control circuit for operating a different SQ– relay on each marker usage. Only the contacts of the SQ– relays have been shown in the drawing, and an example of a typical sequence circuit applicable to my invention is disclosed in more detail in the aforementioned Busch patent.

For the dial tone call under consideration, let it be assumed that the sequence setting is such that relay SQ0 is operated, and also let it be assumed that line circuit 101 on primary switch 0 is the only line on network frame 9 that is requesting dial tone. Since line circuit 101 is terminated on primary switch 0, relay 12LSW0 will be operated to identify to the marker that switch on which the line requesting service is located. The operating circuit for relay 12LSW0 can be traced from battery through the winding of relay 12LSW0, over conductor 1200, through contacts 2 of relay 12DTB, over conductor GS0 through FIGS. 11 and 10 and in cable 2–10 to FIG. 2, through contacts 5 of relay 2MC, over conductor 208, through normal contacts 3 of relay 2G0, over conductor 210 and through contacts 2 of line relay 2L to ground. Relay 12LSW0 operates and locks over a circuit traced from battery through its winding and over conductor 1202, through contacts 9 of relay 10DT, over conductor 1203, through contacts 1 of relay 12LSW0 and through contacts 1 of relay SQ0 to ground through contacts 8 of relay 10DT.

Relay 12LSW0 in operating completes, through its contacts 3, an obvious operating circuit for relay 12LSA, and relay 12SLA, in operating, opens it contacts 1 to release previously operated relay 12DTB. When relay 12DTB releases it disconnects the GS– leads from the windings of the 12LSW– relays, thereby releasing all other 12LSW1–12LSW7 relays if any of these relays had been operated due to request for service on their corresponding primary switches.

With relay 12LSA operated and relay 12DTB released a circuit can be traced in FIG. 12 from ground through contacts 3 of relay 12LSA, through contacts 3 of relay 12DTB and through the winding of relay 12LSG to battery, operating relay 12LSG. Relay 12LSG closes its contacts 2 in FIG. 10 and extends ground over conductor 1005, through contacts 12 of relay 10DT, over conductor 1006, through contacts 7 of 12LSW0 and over conductor G0 in the cable 2–10 to FIG. 2, through contacts 7 of relay 2MC, over conductor 211 and through the winding of group relay 2G0 on frame 9 to battery, operating relay 2G0. With relay 2G0 operated the ground from contacts 2 of line relay 2L on frame 9 is transferred from the GS0 lead, which identified the primary switch location, to the LS9 lead for identifying the particular line on that switch which is requesting service.

In preparation for identifying the particular line requesting service the relay 11DTC was operated. This relay in FIG. 11 was operated over a circuit traced from ground, through contacts 6 of relay 10DT, over conductor 1100, through contacts 1 of relay 11LA and through the winding of relay 11DTC to battery. With relay 11DTC operated in the marker and relay 2G0 operated on frame 9, a circuit can be traced for operating relay 11L9 in the marker to indicate to the marker that the line requesting service is line 9 in group 0. The circuit for operating relay 11L9 can be traced from battery through the winding of relay 11L9, over conductor 1101, through contacts 2 of relay 11DTC, over conductor LS9 to FIG. 10 and in cable 2–10 to FIG. 2, through contacts 3 of relay 2MC, over conductor 212, through contacts 4 of relay 2G0 and over conductor 210 to ground through contacts 2 of line relay 2L. Relay 11L9 in the marker operates and locks through its own contacts 1, through normal contacts 2 of the other 11L– relays, over conductor 1104 and through contacts 2 of sequence relay SQ0 to ground through contacts 13 of relay 10DT.

If other incoming lines on primary switch 0 for frame 9 had been requesting service, ground would have been extended over their corresponding LS– leads to operate the appropriate relays in the group 11L0 to 11L8, but only one 11L– relay will remain operated and locked in accordance with the sequence setting of the SQ– relays.

With relay 11L9 operated and locked, ground is extended through its contacts 3 to operate relay 11LA over an obvious circuit. Relay 11LA, in operating, opens its contacts 1 to release previously operated relay 11DTC. Relay 11DTC releases and disconnects the LS– leads from the windings of the 11L– relays to release any of these relays that would have been operated by other lines requesting service on frame 9, but relay 11L9 identifying the line to be served remains locked over the previously traced locking circuit.

At this point in the call, relays 10LF9, 12LSW0 and 11L9 have been operated and locked to identify to the marker the particular line requesting service, that line being located on frame 9, primary switch 0 and vertical 9. The marker can now proceed to select an idle register circuit and connect the line with the register over the network.

*Selection of a frame having an idle register*

Figure 2:
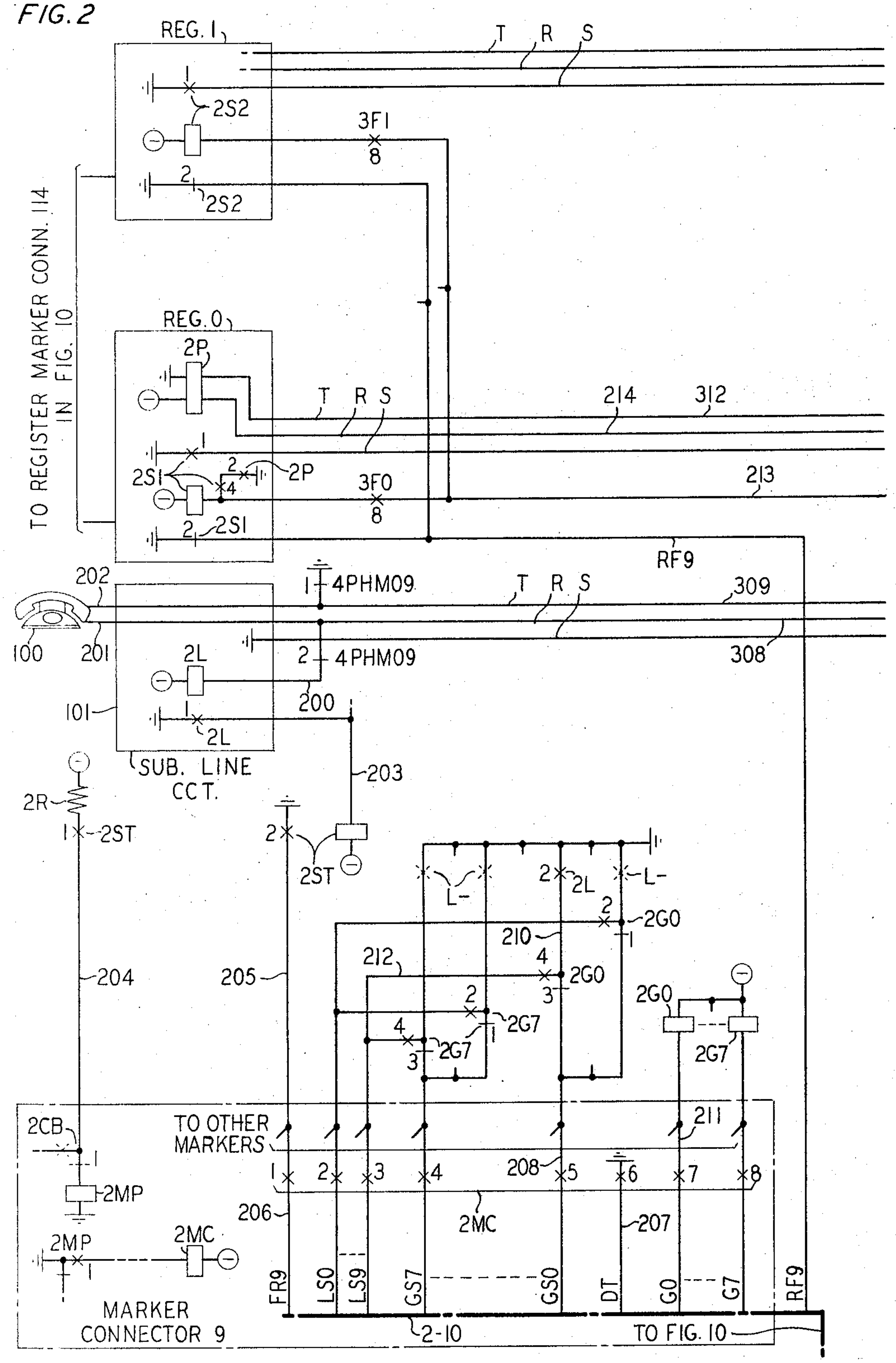
FIGS. 2–14 show a more detailed schematic of this illustrative embodiment of the invention in the same telephone switching system shown in the block diagram of FIG. 1.

When dial tone relay 10DT and off-normal relay 10ON operated closing their respective contacts 17 and 16, a circuit was completed in FIG. 10 for operating dial tone route relay 10RR0. Route relay 10RR0 will facilitate the testing of the proper registers on all of the network frames. Route relay 10RR0, in operating, closes its contacts 1 to extend ground from contacts 1 of relay GS through the winding of frame connecting relay 10FC0 to battery thereby operating relay 10FC0, and relay 10FC0, when operated, extends a trunk test lead from each frame to the marker for the purpose of testing the idle condition of the registers on all frames. Registers, such as registers 0 and 1 on frame 9 in FIG. 2 are marked idle by connecting ground through normal contacts 2 of their respective 2S1 and 2S2 relays over conductor RF9 to the marker, and similarly, register 2 on frame 0 is marked idle by connecting ground through contacts 2 of its 6S1 relay over conductor RF0 to the marker.

Each outgoing circuit (trunk, register, etc.) is connected to an RF– lead in the same manner, and the RF– leads for all outgoing circuits in a particular group are extended to the marker through contacts of a frame connecting relay (FC–) corresponding to that particular trunk or register group. The frame connecting relays are operated by route relays to select those outgoing circuits associated with a particular route.

For the call being described let it be assumed that all register circuits are idle and all network frames are idle so that the marker will select an idle register located on the same frame and primary switch as the line requesting service.

When the marker was seized and prepared for connection to the frame, relay 10ON operated as described above, and a circuit was completed for operating relay 10TFE in FIG. 10. This circuit can be traced from ground through contacts 1 of relay 10ON, through contacts 1 of relay SCF, through contacts 2 of relay CF, through contacts 1 of relay 10TFA and through the winding of relay 10TFE to battery operating relay 10TFE in preparation for connecting the RF– test leads to the windings of relays 10TF– in the marker.

Figure 6:
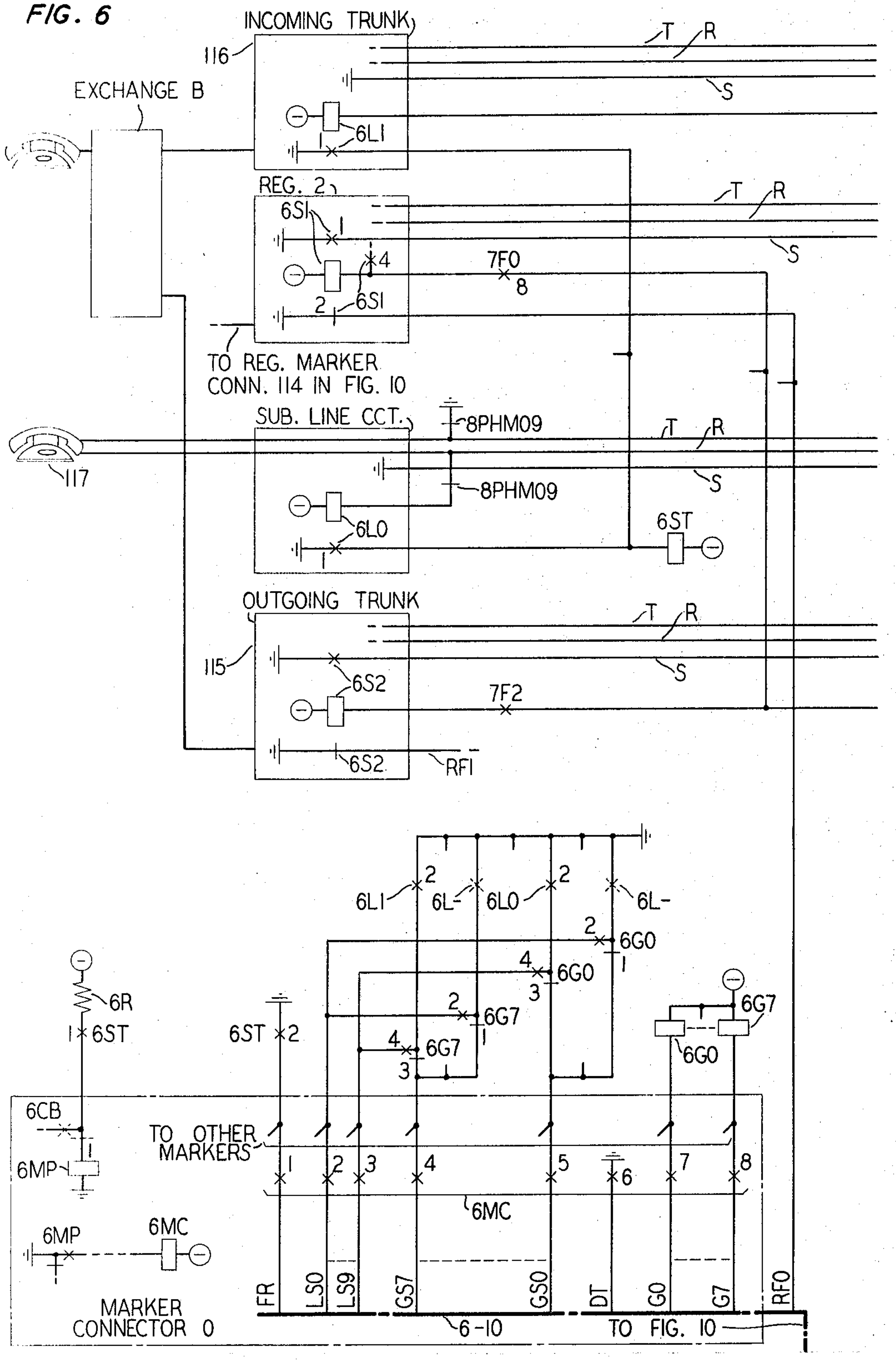
Figure 7:
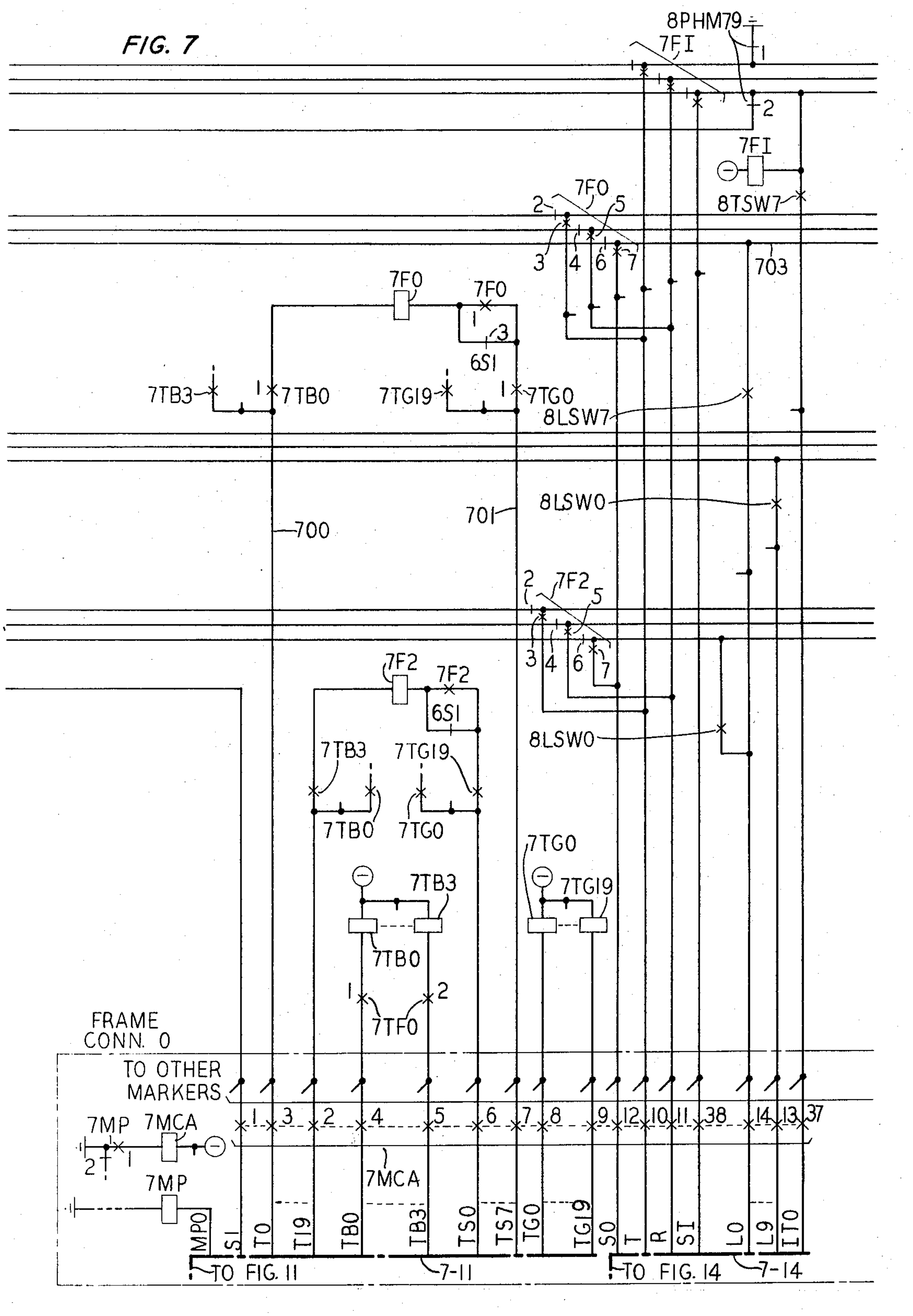

With register 2 on frame 0 idle, ground is extended through normal contacts 2 of relay 6S1 associated with register 2 in FIG. 6, over conductor RF0 in cable 6–10 to FIG. 10, through contacts 1 of relay 10FC0, through normal contacts 1 of relay 13FB0 which is released at this time indicating that frame 0 is idle, through contacts 1 of relay 10TFE, over conductor 1008 and through the winding of relay 10TF0 to battery, operating the relay 10TF0.

Similarly, ground is extended through contacts 2 of relays 2S1 and 2S2, associated with registers 0 and 1 respectively, over conductor RF9 in cable 2–10 to FIG. 10, through contacts 10 of relay 10FC0, through contacts 1 of frame busy relay 13FB9, through contacts 10 of relay 10TFE, over conductor 1009 and through the winding of relay 10TF9 to battery, operating trunk frame identification relay 10TF9. If there are other idle registers on other idle frames, relays 10TF1–10TF8 would also be operated, accordingly, to indicate those frames having idle registers.

With relay 10TF9 operated and 10LF9 having previously been operated and locked, a circuit is completed for locking relay 10TF9. This circuit can be traced from battery through the winding of relay 10TF9, through its operated contacts 1 and over conductors 1010 and 1003 to ground over the previously traced locking path for relay 10LF9. With any 10TF– relay operated ground is extended through contacts 4 of the operated 10TF– relay, through contacts 2 of relay 10LFA, through contacts 3 of relay 10DTA, and through the winding of relay 10TFA to battery, operating relay 10TFA. Relay 10TFA, in operating, opens its contacts 1 to release relay 10TFE, and relay 10TFE, in releasing, disconnects the RF– leads from the windings of the 10TF– relays. All 10TF– relays release except relay 10TF9 which has been locked operated through contacts of relay 10LF9.

Thus, although idle registers were available on other network frames, the marker has given preference to the registers on frame 9 on which the request for dial tone originated.

Figure 11:
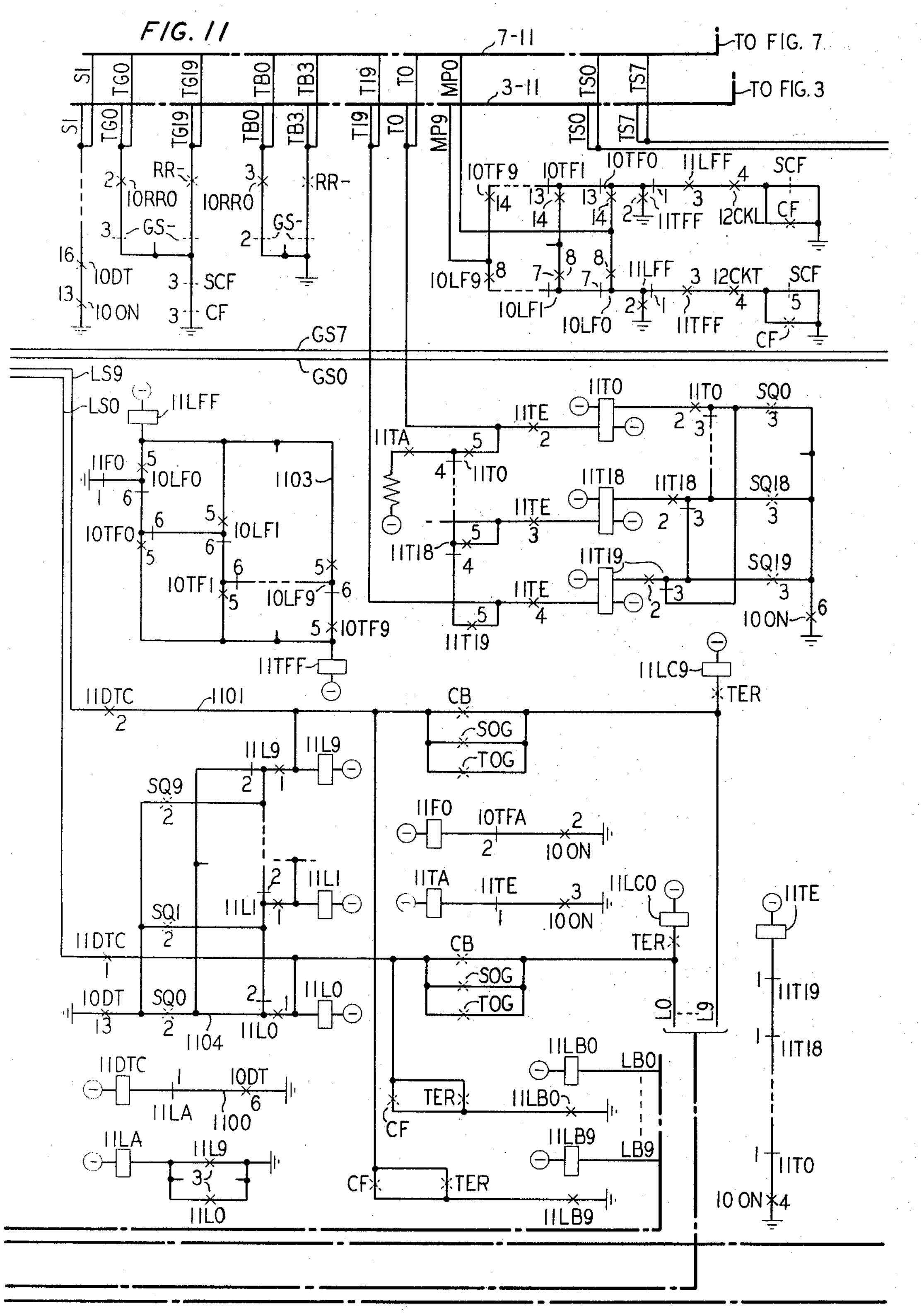

When the marker was seized by network frame 9 through marker connector 9 and relay 10ON in the marker operated, relay 10ON closed its contacts 2 in FIG. 11 to complete a circuit from ground, through normal contacts 2 of relay 10TFA, and through the winding of relay 11F0 to battery operating relay 11F0. Relay 10ON also closed its contacts 3 in FIG. 11 to extend ground through contacts 1 of relay 11TE, and through the winding of relay 11TA to operate relay 11TA. Similarly, relay 10ON closed its contacts 4 to extend ground through contacts 1 of relay 11T0, through normal contacts of relays 11T1–11T17 not shown, through contacts 1 of relays 11T18 and 11T19 and through the winding of relay 11TE to ground thereby operating relay 11TE.

Frame seizure

As a result of relay 10TFA operating to indicate to the marker that an idle register on an idle frame is available, the marker can now proceed to seize that frame through the frame connector and identify the idle registers on the frame. From the identity of idle registers on the frame and in accordance with a feature of my invention, the marker will then attempt to select a register, on the same primary switch as the line requesting service.

When relay 10TFA operated, it opened its contacts 2 to interrupt the operating circuit for relay 11F0 which releases. Relay 11F0, in releasing, extends ground through its contacts 1, through normal contacts 6 of relay 10LF0 and relay 10TF0, through normal contacts 6 of relays 10LF1 and 10TF1, through normal contacts of other 10LF– and 10TF– relays (not shown), through operated contacts 5 of relay 10LF9, over conductor 1103 and through the winding of line frame first relay 11LFF to operate the latter relay thereby indicating that the frame having the line requesting service (which in this example is also the frame having an idle register) should be seized first. Had a different frame containing an idle register been selected, trunk frame first relay 11TFF would have been operated indicating to the marker that the frame having the idle register should be seized before the frame serving the calling line.

Figure 3:
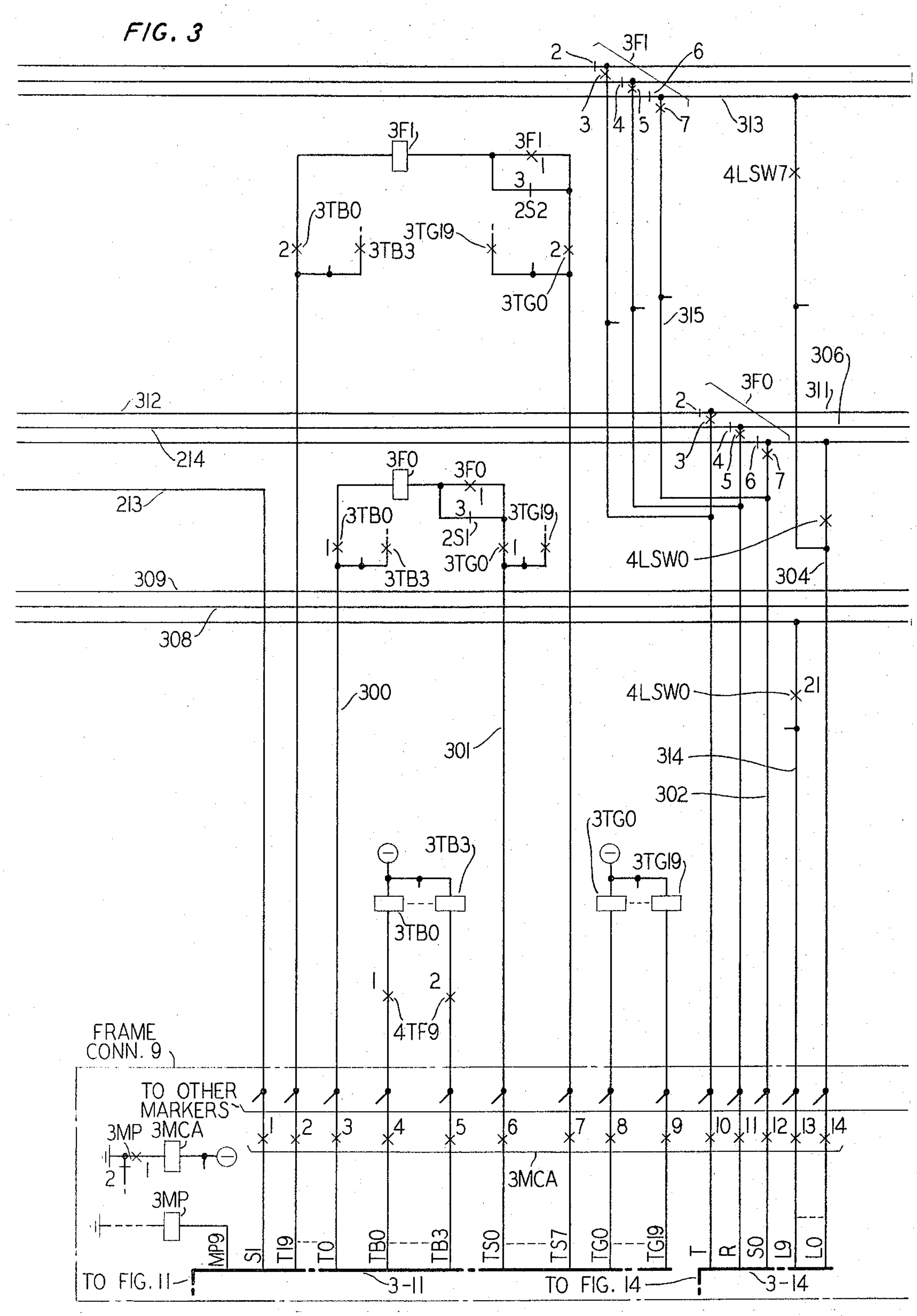

With relay 11LFF operated, therefore, ground is extended through its contacts 2 in FIG. 11, through normal contacts 7 of relays 10LF0 and 10LF1, through normal contacts of other 10LF– relays (not shown), through operated contacts 8 of relay 10LF9, over conductor MP9 in cable 3–11 to FIG. 3, through the winding of relay 3MP and through contacts of other MP relays (not shown) to ground. If no other marker is attempting to seize frame 9, relay 3MP operates and closes its contacts 1 to complete an obvious operating circuit for multicontact connector relay 3MCA which operates to associate the marker with network frame 9.

Figure 4:
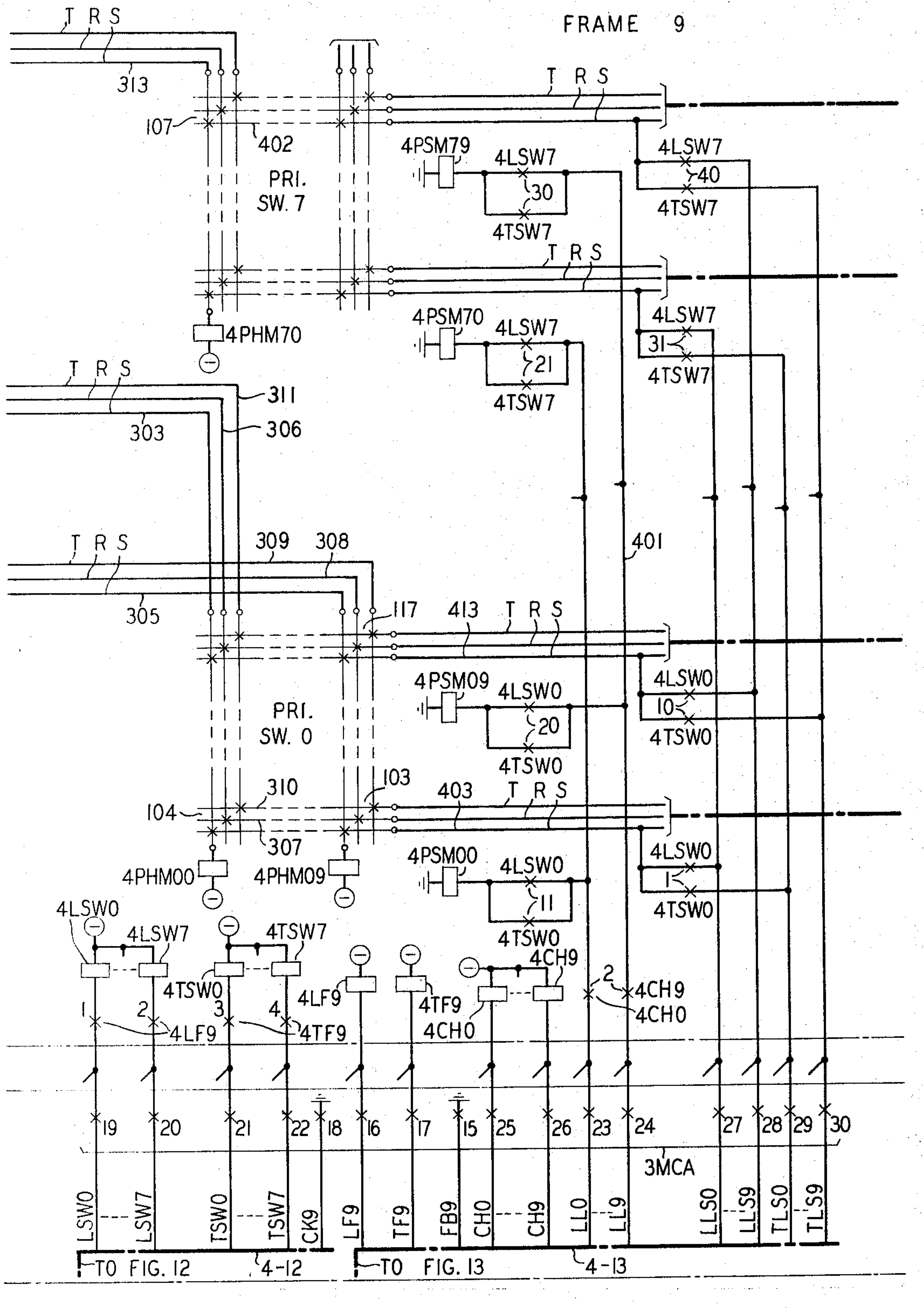
Figure 13:
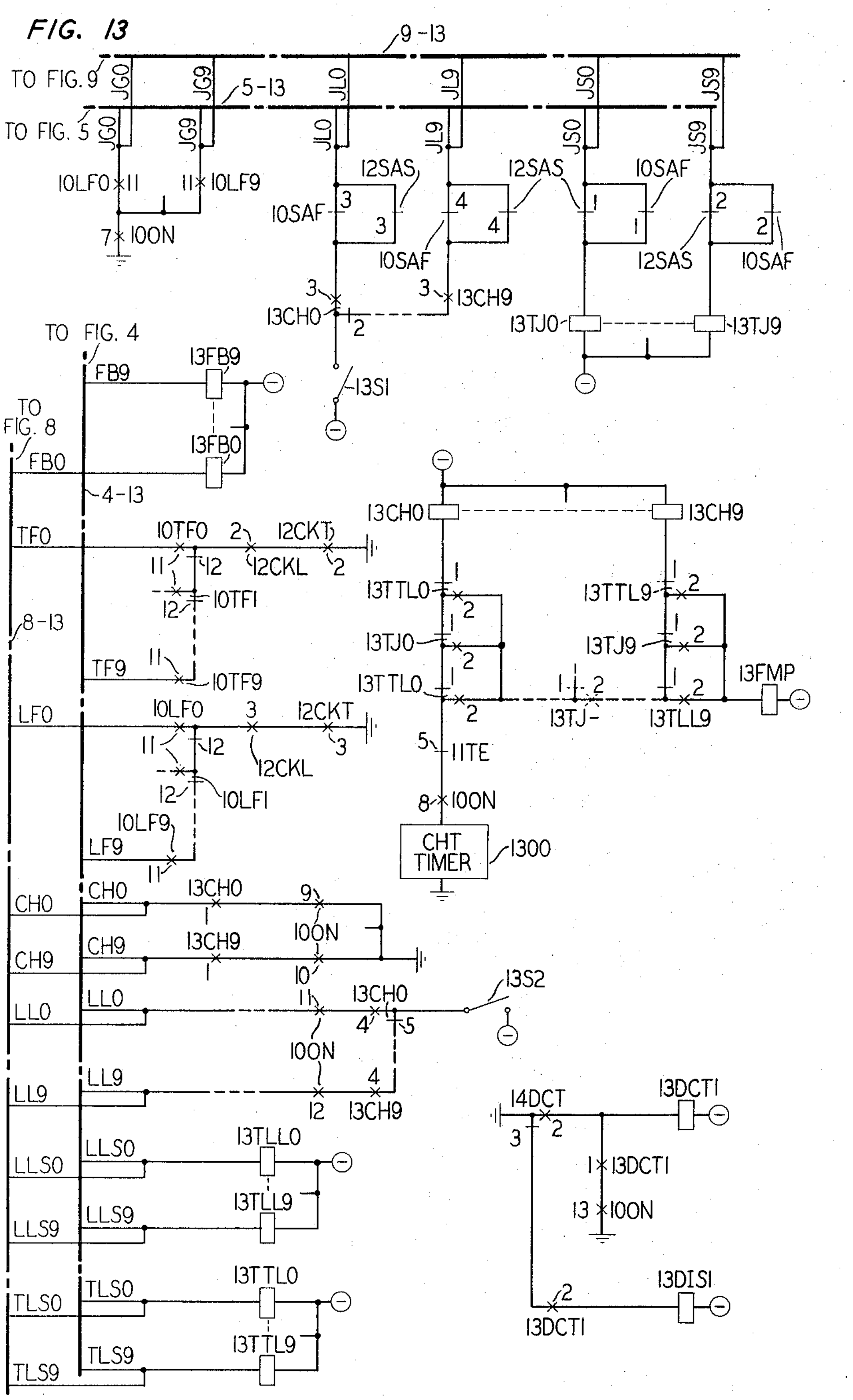

When relay 3MCA operates it closes its contacts 15 in FIG. 4 to extend ground over conductor FB9 in cable 4–13 to FIG. 13 to operate frame busy relay 13FB9 which indicates that frame 9 is now busy. Relay 3MCA also closes its contacts 18 in FIG. 4 to extend ground over conductor CK9 in cable 4–12 to FIG. 12, through operated contacts 9 of relay 10LF9, through normal contacts of relays 10LF8–10LF2 (not shown), through normal contacts 10 of relays 10LF1 and 10LF0 and through the winding of relay 12CKL to battery operating relay 12CKL. Relay 12CKL, in operating, indicates to the marker that the frame having the line requesting service has been seized.

Since the frame containing the calling line is also the frame having an idle register thereon, the ground on conductor CK9 is also extended through operated contacts 9 of relay 10TF9 and through normal contacts of relays 10TF8–10TF0 to operate relay 12CKT thereby indicating that the frame having an idle register has also been seized.

With both marker relays 10TF9 and 10LF9 operated, relay 10SAF can now operate to indicate to the marker that the available register is on the same frame as the line requesting service. The circuit for operating relay 10SAF can be traced from ground, through contacts 1 of relays 12CKT and 12CKL, through contacts 4 of relay 10LF9, through contacts 3 of relay 10TF9 and through the winding of relay 10SAF to battery.

With relays 12CKT and 12CKL operated circuits are completed for operating relays 4TF9 and 4LF9 on network frame 9. These circuits can be traced from ground in FIG. 13 through contacts 2 and 3 of relay 12CKT, through contacts 2 and 3 of relay 12CKL, through normal contacts 12 of relays 10TF0 and 10LF0, through normal contacts 12 of relays 10TF1 and 10LF1, through normal contacts of other 10TF– and 10LF– relays (not shown), through operated contacts 11 of relays 10TF9 and 10LF9, over conductors TF9 and LF9 in cable 4–13 to FIG. 4, through contacts 17 and 16 of relay 3MCA, through the windings of relays 4TF9 and 4LF9, respectively, to battery operating both the 4TF9 and the 4LF9 relays. The 4TF9 and the 4LF9 relays prepare for operation of a plurality of circuits on the network frame, and the function of these will be discussed below.

Selection of an idle register

When the marker is connected to the selected frame through the operation of the frame connector, a group of busy test leads, one for each register on the frame, is extended from the marker to the frame. The marker then tests for an idle register and selects a register to serve the calling line by preferring those registers which are located on the same primary switch as the calling line. The outgoing circuits, such as trunks and registers, on a frame are divided into twenty-block groups each being associated with a corresponding TB– relay so that on any frame all trunks or registers in a particular route will be in the same twenty-block group although the same twenty-block group may also contain trunks and registers associated with other routes. The twenty-block group and the register within the group are determined by a route relay.

Route relay 10RR0 used on a dial tone call identifies the register group by operating one of the twenty-block (TB–) relays on the frame and identifies the location of the registers in the twenty-block group by operating one of a group of test group (TG–) relays on the frame. The operating circuit for the twenty-block relay 3TB0 associated with dial tone registers can be traced from ground in FIG. 11, through contacts 2 of ground supply relay GS, through contacts 3 of relay 10RR0, over conductor TB0 in cable 3–11 to FIG. 3, through contacts 4 of relay 3MCA, through contacts 1 of relay 4TF9 and through the winding of relay 3TB0 to battery. The operating circuit for relay 3TG0 also associated with dial tone registers can be traced from ground in FIG. 11, through contacts 3 of relays CF, SCF and GS, through contacts 2 of relay 10RR0, over conductor TG0 in cable 3–11 to FIG. 3, through contacts 8 of relay 3MCA and through the winding of relay 3TG0 to battery. Both relays 3TB0 and 3TG0 operate on frame 9 to prepare for the test of idle dial tone registers thereat.

Previously, when the marker was first seized and off-normal relay 10ON operated, a circuit was completed for operating relay 12TSE in preparation for selection of an idle outgoing circuit. The operating circuit for relay 12TSE can be traced from battery through its winding, through contacts 4 of relays SCF and CF, contacts 1 of relay 12TSA and through contacts 5 of relay 10ON to ground to operate relay 12TSE and extend test conductors TS– to the windings of relays 12TSW– in the marker.

The idle test circuit for register 0 on frame 9 can be traced from battery through the lower winding of marker relay 11T0 in FIG. 11, through contacts 2 of relay 11TE, over conductor T0 in cable 3–11 to FIG. 3, through contacts 3 of relay 3MCA, over conductor 300 through contacts 1 of relay 3TB0, through the winding of relay 3F0 associated with register 0, through normal contacts 3 of relay 2S1, through contacts 1 of relay 3TG0, over conductor 301, through contacts 6 of relay 3MCA, over conductor TS0 in cable 3–11 to FIG. 11, through FIG. 11 to FIG. 12, through contacts 3 of relay 12TSE and through the upper, high resistance winding of relay 12TSW0 to ground. Relay 12TSW0 operates over this circuit, but relay 11T0 in the marker and relay 3F0 associated with register 0 will not operate over this circuit at this time.

A similar circuit can be traced for register 1 on primary switch 7 of frame 9 from battery through the lower winding of marker relay 11T19, over conductor T19 and through the winding of relay 3F1 associated with register 1, back over conductor TS7 to the marker and through the upper high resistance winding of relay 12TSW7 operating the latter relay. The operation of relays 12TSW0 and 12TSW7 indicate to the marker that the registers on primary switch 0 and 7 are idle, and if other registers on other switches of the frame are idle their corresponding 12TSW– relays would also be operated.

The operation of any 12TSW– relay closes ground through its contacts 1, through contacts 4 of relay 12DTB, through contacts 2 of relay 12LSA and through the winding of relay 12TSA to battery operating relay 12TSA. Relay 12TSA, in operating, opens its contacts 1 to release the previously operated relay 12TSE which disconnects the TS– leads from the windings of the 12TSW– relays. Relay 12TSW7 will release, but relay 12TSW0 will lock over a circuit traced from battery through the lower winding of relay 12TSW0, through its contacts 6 and over conductor 1206 to ground over the previously traced locking circuit for relay 12LSW0 thereby causing the marker to prefer the idle register located on the same switch as the calling line.

It should be noted that by utilizing the calling line location information, the marker has preferred the selection of an idle register located on the same switch as the calling line. Had no registers been available on the same switch, the marker would have selected an idle register on a different switch by locking operated a different 12TSW– relay. A typical call involving the latter operation will be described in more detail below.

With both relays 12TSW0 and 12LSW0 locked operated a circuit is completed from ground through contacts 5 of relay 12TSW0, contacts 8 of relay 12LSW0 and through the winding of relay 12SAS to battery, operating relay 12SAS and indicating to the marker that the calling line and the register selected are on the same primary switch.

When relay 12TSA is operated, it also closed its contacts 2 to extend ground through normal contacts 4 of relay 12TSE and through the winding of relay 12TSG to battery, operating relay 12TSG. Relay 12TSG, in operating, closes its contacts 1 to extend low resistance ground through contacts 5 of relay CF, contacts 1 of relay 14DCT, through contacts 3 of relay 12TSW0 operated, over conductor TS0 and over the previously traced circuit through the windings of relay 3F0 associated with the selected register and relay 11T0 in the marker to operate both the 3F0 and the 11T0 relays.

Relay 3F0 associated with register 0 extends a number of circuits from the register to the marker for subsequent channel testing, and relay 3F0 prepares register 0 for the reception of the calling line location from the marker.

When relay 3F0 associated with register 0 operates, a circuit is completed for operating relay 2S1 in the register to make register 0 busy. This circuit can be traced from battery, through the winding of relay 2S1, through contacts 8 of relay 3F0, over conductor 213 to FIG. 3, through contacts 1 of relay 3MCA, over conductor S1 in cable 3–11 to FIG. 11, through marker equipment (not shown), through contacts 16 of relay 10DT and through contacts 13 of relay 10ON to ground. Relay 2S1, in operating, opens its contacts 2 to remove ground from the busy test lead RF9 and opens its contacts 3 in the operating circuit for relay 3F0, but relay 3F0 remains operated through its contacts 1 which are in parallel with the contacts 3 of relay 2S1.

Marker relay 11T0, in operating, interrupted the operating circuit for relay 11TE which releases, disconnecting the T0–T19 test conductors from the windings of relays 11T0–11T19, but relay 11T0 remains locked operated over a circuit traced from battery, through its upper winding through contacts 2 of relay 110 and through contacts 3 of relay SQ0 to ground through contacts 6 of relay 10ON.

*Channel test and selection*

It will be recalled from the general description that a connection between two circuits can be effected in a variety of ways depending on the location of the circuits involved. If the circuits are both located on the same primary switch, they can be interconnected over a channel comprising only an idle horizontal on that switch and the hold magnets associated with the two circuits. If, however, the incoming and outgoing circuits to be connected are on different primary switches of the same frame, they can be connected using a channel comprising two idle links (one to each primary switch) and coupling the idle links over an idle horizontal on a junctor switch, and preference will be given to the idle horizontals not having junctors terminated thereon. On the other hand, if the circuits to be connected are on different frames, an idle link on each frame and an idle junctor between the frames can be utilized for the channel or connecting path between the two circuits.

The marker is equipped to simultaneously test three components in each of ten channels, and a channel is available for use only if all of its components, i.e., links and junctors, are idle. It will be noted, however, that the number of channel components required for a connection will vary depending on the location of the circuits to be interconnected. Furthermore, on an intraframe call requiring only two links and no junctor, the marker may, under certain circumstances, couple the links over a junctor horizontal which serves a junctor to another frame necessitating a testing of idle junctors. Of course, preference will be given to unwired junctor horizontals on intraframe calls, since the junctor is not needed, and if a wired horizontal were used the junctor and its horizontal on the other frame would be unavailable for service.

Although the number of channel components to be tested may vary with different calls, for convenience the channel test circuit will always appear to be testing three components of a channel; namely, the line links serving the incoming circuit, the trunk links serving the outgoing circuit and junctors which connect the frames containing the two circuits to be connected. On those calls when less than three channel components are needed, arrangements have been included in the system for simulating a test of the components not being used to satisfy the requirements of the channel test circuit.

Returning now to the call being described, it will be recalled that register 0 has been selected for connection to calling line circuit 101, and the marker can now select an idle channel to interconnect the line circuit with the register. In accordance with one feature of my invention, where both the incoming and outgoing circuits are located on verticals of the same primary switch, these circuits can be interconnected by first operating a horizontal select bar on that switch and then operating both vertical hold magnets thereby closing two crosspoints to the same horizontal to interconnect the circuits exclusive of any other portion of the network.

When relay 4TF9 was operated on frame 9, a circuit was completed for operating a junctor group cut-in relay on frame 9 to permit the marker to test for idle junctors. This circuit can be traced from ground, through contacts 7 of relay 10ON in FIG. 13, through contacts 11 of relay 10LF9, over conductor JG9 in cable 5–13 to FIG. 5, through contacts 32 of relay 3MCA, through contacts 6 of relay 4TF9 and through the winding of junctor group cut-in relay 5JG9 to battery operating relay 5JG9. The junctor group cut-in relays (JG–) normally extend the sleeve leads of ten junctors over conductors JS0–JS9 to the windings of ten junctor test relays 13TJ0–13TJ9 and the marker, and ground on a sleeve of a junctor operates a corresponding 13TJ– relay indicating that a particular junctor is busy. It will be noted, however, that both the 10SAF and 12SAS relays are operated, indicating that the calling line and register circuit are on the same frame and same primary switch. With these relays operated, the JS0–JS9 test leads are interrupted to prevent the operation of junctor test relays 13TJ0–13TJ9, thereby simulating to the channel test circuit in the marker that all junctors are idle since it will not be necessary to use a junctor on this call.

Furthermore, it should be noted that in this illustrative embodiment only ten network frames are shown and each network frame is connected by junctors to nine other network frames. If junctor switches having more than nine horizontals are employed in the system, those horizontals in excess of nine need not be connected over junctors to other frames and can advantageously be used for intraframe connections such as the call being described.

When relay 12TSG had operated upon the selection of an idle register, relay 12TSG closed its contacts 2 to extend the ground through contacts 6 of relay CF, through operated contacts 15 of relay 12TSW0 over conductor TSW0, in cable 4–12 to FIG. 4, through contacts 21 of relay 3MCA, through contacts 3 of relay 4TF9 and through the winding of relay 4TSW0 to battery operating relay 4TSW0. Relay 4TSW0, in operating, closes its contacts 1–10 to extend trunk link test leads TLS0–TLS9 from the sleeves of the links serving primary switch 0 to the windings of test trunk link relays 13TTL0–13TTL9 in the marker. If any of the links are busy they will be marked by ground on their sleeves to operate the corresponding 13TTL– relays in the marker.

A similar circuit was completed for operating relay 4LSW0 on frame 9 for extending line link test leads to those links serving the calling line. This circuit can be traced from ground in FIG. 12 through contacts 1 of relay 12LSG, over conductor 1204, through contacts 4 of relay 12LSW0, over conductor LSW0 in cable 4–12, through contacts 19 of relay 3MCA, through contacts 1 of relay 4LF9 and through the winding of relay 4LSW0 to battery operating the latter relay.

When relay 4LSW0 operates it extends line link test leads LLS0–LLS9 from the links serving the primary switch of the calling line to the windings of test line link relays 13TLL0–13TLL9 in the marker, and if any of the links are busy, they will be marked by ground to operate their corresponding 13TLL– relays. Of course, it will be realized in the examples under the consideration, the register and the calling line are in the same primary switch 0 and therefore relays 4LSW0 and 4TSW0 connect their respective line link and trunk link test leads to the sleeves of the same ten links serving primary switch 0. Although a link will not be used on this particular connection between line circuit 101 and register 0, the horizontal associated with an idle link will be used, and the link test relays are conveniently connected to the sleeve conductors of the links to ascertain the idle condition of primary switch horizontals.

It will be noted that the requirements of the channel test circuit are satisfied by connecting both the line link and trunk link test relays to the same sleeve conductors on an intra-switch call. In the alternative, the test conductors for either set of links could be interrupted in the same manner that the junctor test conductors were interrupted to satisfy the channel test circuit.

At this point in the call the marker is ready to select an idle channel. The testing and selecting of an idle channel is similar to that described in Patent 2,585,904 granted to A. J. Busch of February 19, 1952. In the Busch patent, a timing circuit was utilized to delay the selection of the channel until all of the test relays (13TJ–13TTL– and 13TLL–) had sufficient time to operate. When the timing circuit represented by block diagram 1300 in FIG. 13 operates after a sufficient delay, ground is extended through operated contacts 8 of relay ON, through normal contacts 5 of relay 11TE, through normal contacts 1 of relays 13TLL0, 13TJ0 and 13TTL0 and through the winding of relay 13CH0 to battery operating relay 13CH0. The normal 13TJ–, 13TTL– and 13TLL– relays indicate that the respective components of the channel being tested are idle. If any one component is busy the corresponding test relay would be operated to advance the ground from timer 1300 to a higher numbered channel. For this example, let it be assumed that all components of all channels are idle, and therefore, channel 0 is selected as indicated by the operation of relay 13CH0.

*Channel operation*

After the selection of an idle connecting path or channel has been completed, the marker will proceed to set up a selected channel by operating the appropriate select and hold magnets. The marker will then test the channel for false crosses or ground and for continuity to determine if the channel is in proper condition for service, and if the channel is in satisfactory condition for service, the marker will extend the channel from the subscriber to the selected register and permit the subscriber to assume control of the register.

The operating circuits in the marker for testing and establishing a channel between the calling line and the idle register have been simplified and, where possible, represented by various manual switches. It will be understood that suitable circuitry for performing these functions automatically can be found in the aforementioned Busch patent and need not be disclosed in detail herein for complete understanding of my invention.

When relay 13CH0 operated in the marker, it closed its contacts 1 to extend the ground from contacts 9 of relay 10ON in FIG. 13, over conductor CH0 in cable 4–13 to FIG. 4, through contacts 25 of relay 3MCA and through the winding of relay 4CH0 to battery, operating relay 4CH0 on frame 9.

Figure 5:
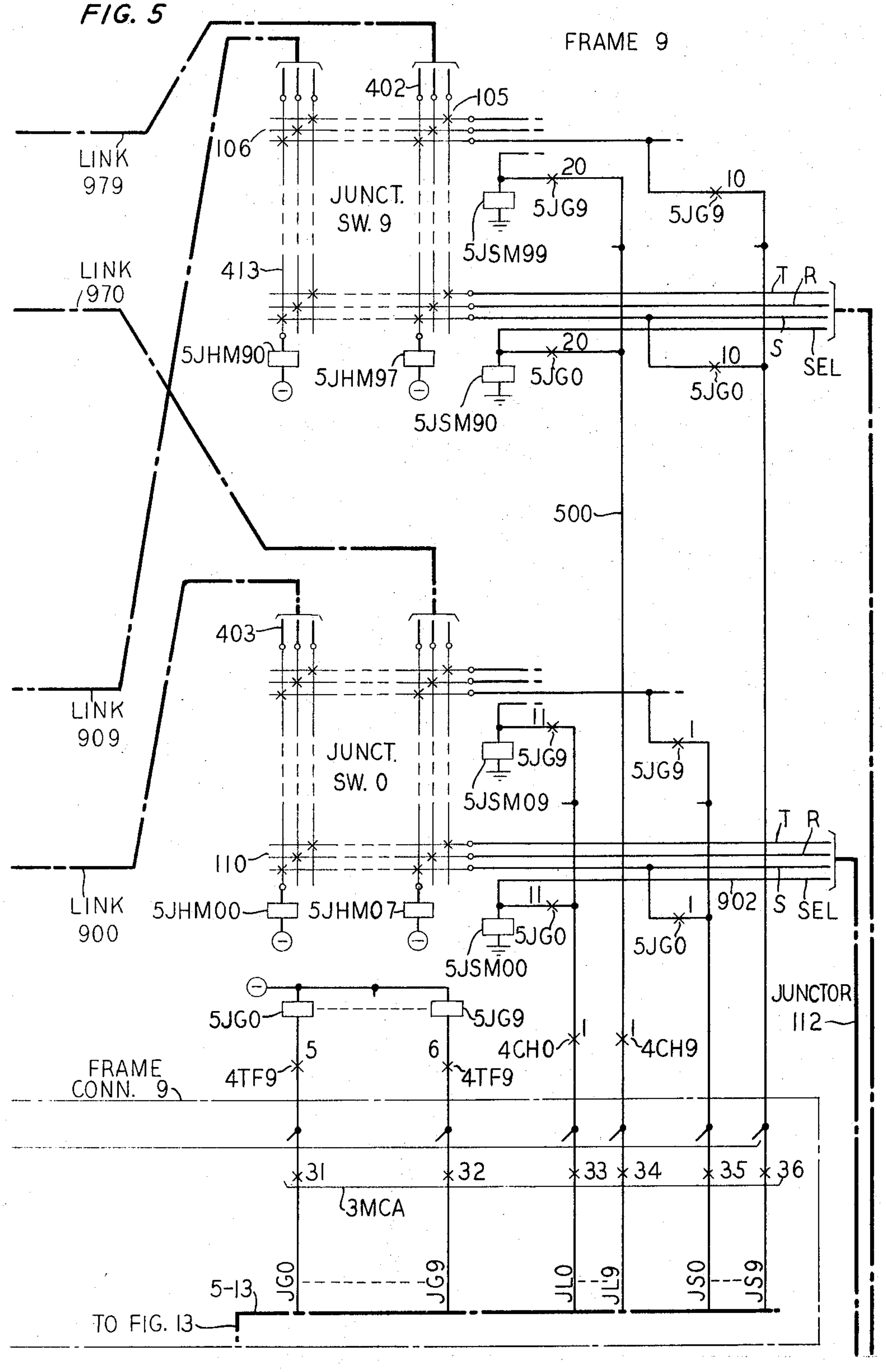

Relay 4CH0 on frame 9 closes its contacts 1 in FIG. 5 to extend the operating circuit for the junctor select magnet 5JSM00 to the marker, however, since both relays 10SAF and 12SAS have been operated indicating that the calling line and register are on the same frame and primary switch and that a junctor is not required on this call, the junctor select magnet 5JSM00 will not be operated.

At this time, switch 13S2 (simulating the marker circuitry for operating the primary switch select magnet) will be operated in the marker to extend battery, through contacts 4 of relay 13CH0, contacts 11 of relay 10ON, through marker equipment (not shown) and over conductor LL0 in cable 4–13 to FIG. 4, through contacts 23 of relay 3MCA, contacts 2 of relay 4CH0 and through contacts 11 of relays 4LSW0 or 4TSW0 to ground through the winding of select magnet 4PSM00, operating the latter select magnet associated with channel 0.

With primary select magnet 4PSM00 operated, the marker proceeds to operate the hold magnet associated with the register 0. This circuit is shown being completed by the operation of switch 14S1 which represents certain marker functions that have been omitted, and switch 14S1 extends ground through marker equipment (not shown), through contacts 14 of relay 10DT and over conductor S0 in cable 3–14 to FIG. 3, through contacts 12 of relay 3MCA, over conductor 302, through contacts 7 of relay 3F0 associated with register 0, over conductor 303 and through the winding of primary hold magnet 4PHM00 to battery, operating that hold magnet associated with register 0. Select magnet 4PSM00 having been operated, primary hold magnet 4PHM00 now closes crosspoints 104.

The marker then proceeds to test for false crosses and grounds on the channel after which a similar circuit is completed for operating the subscriber's line hold magnet. This circuit can be traced from ground, through switch 14S2 operated to close its contacts 1, through marker equipment not shown, over conductor 1301, through contacts 15 of relay 10DT, through normal contacts 5 of relays 11L0, 11L1 and other 11L– relays (not shown), through operated contacts 4 of relay 11L9 and over conductor L9 in cable 3–14, through contacts 13 of relay 3MCA, over conductor 314, through contacts 21 of relay LSW0, over conductor 305 and through the winding of hold magnet 4PHM09 to battery operating the latter hold magnet which closes crosspoints 103.

When the primary hold magnet 4PHM09 associated with line circuit 101 operates, it opens its contacts 1 and 2 in FIG. 2 to disconnect line relay 2L from the subscriber line and line relay 2L releases.

With both the line and register hold magnets now operated, the channel connection has been established, and the marker can then make a continuity test which is made to ascertain that all crosspoints of the selected channel are closed and a continuous pair of conductors is extended from the trunk appearance to the subscriber line. The continuity test circuit is similar to that disclosed in more detail in the aforementioned Busch patent and is represented herein by block diagram 1400 in FIG. 14.

Having made a successful continuity test, the marker performs a double connection test. This double connection test is symbolically represented herein by the operation of switch 14S2 to its alternate position to open its contacts 1 and close its contacts 2 and also the release of switch 14S1 to release select magnet 4PSM00. With switches 14S1 released and switch 14S2 operated to close its contacts 2, ground is connected through the winding of relay 14DCT to the sleeve of a channel to maintain the hold magnets operated, and if no double connection exists, relay 14DCT operates. Relay 14DCT, in operating, closes its contacts 2 in FIG. 13 to operate relay 13DCT1 and relay 13DCT1 operates and locks through its contacts 1 to ground through operated contacts 13 of relay 10ON.

Relay 14DCT, in operating, opens its contacts 1 in FIG. 12 to release relay 3F0 associated with register 0, and when relay 3F0 releases, it extends the tip, ring and sleeve conductors from the register to the subscriber line to connect the subscriber with dial tone and permit the subscriber to assume control of a connection. When relay 3F0 releases, it opens the operating circuit for relay 2S1 in the register, but relay 2S1 is a slow release relay to allow sufficient time for the subscriber to assume control of the register through the operation of register relay 2P which holds relay 2S1 and the channel operated.

The circuit for operating relay 2P can be traced from battery through its lower winding, over ring conductor 214 to FIG. 3, through contacts 4 of relay 3F0, over conductor 306, through crosspoints 104, over conductor 307 on horizontal 0 of primary switch 0, through crosspoints 103, over conductor 308 to FIG. 2 and through the operated switchhook contacts at station 100, back over conductor 309 to FIG. 4, through crosspoints 103, over conductor 310, through crosspoints 104, over conductor 311, normal contacts 2 of relay 3F0, conductor 312 and through the upper winding of relay 2P to ground, operating relay 2P. Relay 2P extends ground through its contacts 2, contacts 4 of relay 2S1 to lock relay 2S1 operated, and relay 2S1 extends ground through its operated contacts 1 to the sleeve of the channel to hold the channel operated.

The same sleeve ground that holds the channel operated is also extended back over conductor L9 in cable 3–14 to FIG. 14 to shunt down relay 14DCT in the marker thereby informing the marker that the control of the connection has been transferred to the subscriber. With relay 14DCT shunted down and relay 13DCT1 operated, a circuit is completed for operating disconnect relay 13DIS1 from ground through normal contacts 3 of relay 14DCT, through operated contacts 2 of relay 13DCT1 and through the winding of relay 13DIS1 to battery.

Relay 14DIS1 operates and begins the release of all of the marker relays. A description of the release of the circuit need not be given herein for a full understanding of the invention. For purposes of illustration let it be assumed that the release is similar to that described in the aforementioned Busch patent.

*Selection of a register on a different primary switch of the same frame*

In the previous example it was assumed that all registers were idle in all frames and the marker selected a register terminated on the same frame and the same primary switch as the calling line. Let it now be assumed that line circuit 101 on primary switch 0 of frame 9 has initiated a call and that register 0 on that same primary switch is busy so that a lesser preferred register on the same frame, but on a different primary switch, will be selected.

When a customer at station 100 initiates a call a sequence of operations takes place, and these operations will be the same as that described above with respect to the previous call up to the point where the marker is attempting to select an idle register. It will be recalled from the prior example that, upon recognizing a request for dial tone, from station 100, the marker identified the location of the calling line by operating relay 10LF9, 12LSW0, and 11L9 and then proceeded to test for an idle register on an idle network frame preferring that frame on which the calling line appears.

In this example, the calling line is located on frame 9, and it has been assumed that register 0 is busy but that register 1 on frame 9 is idle, therefore, the marker will again connect to frame 9 through frame connector 9 as previously described. The operation of route relay 10RR0, indicating a dial tone call, causes the operation of the twenty-block relay 3TB0 and the trunk group test relay 3TG0 on frame 9 as before, and the 3TB0 and 3TG0 relays connect the register test leads from the frame to the marker.

Under the assumption that register 0 on frame 9 is busy, but register 1 located on primary switch 7 of frame 9 is idle, relay 12TSW7 in the marker will be operated indicating to the marker the switch on which the idle register is located. Relay 12TSW7 extends ground through its contacts 1 to operate relay 12TSA, and relay 12TSA, in operating, opens its contacts 1 to release relay 12TSE to disconnect the register test leads TS– from the windings of the 12TSW– relays. Relay 12TSW7 will be held operated, however, over a circuit traced from battery, through its lower winding, through its contacts 6, through normal contacts of relays 12TSW6–12TSW2 (not shown), through normal contacts 7 of relays 12TSW1 and 12TSW0 to ground over conductor 1206 through the previously traced locking circuit for relay 12LSW0. It will be recalled that relay 12LSW0 had been operated and locked as a result of the marker ascertaining that the calling line was located on primary switch 0 of frame 9.

With relays 12LSW0 and 12TSW7 operated the 12SAS relay will not operate, and the marker is thereby informed that the line and register are on different primary switches.

Relay 12TSE, in releasing, operates relay 12TSG to extend low resistance ground over test lead TS7 to operate relay 3F1, associated with register 1, and relay 11T19 in the marker. Relay 3F1 prepares register 1 for operation, and marker relay 11T19 interrupts the operating circuit for relay 11TE which releases disconnecting test leads T– from the windings of the 11T– relays.

When relay 12TSG operated upon the selection of an idle register, it extended ground through its contacts 2 in FIG. 12, through contacts 6 of relay CF, contacts 14 of relays 12TSW0 and 12TSW1, through normal contacts of other 12TSW– relays (not shown), through operated contacts 15 of relay 12TSW7 and over conductor TSW7 in cable 4–12 to FIG. 4, through contacts 22 of relay 3MCA, contacts 4 of relay 4TF9 and through the winding of relay 4TSW7 operating the latter relay in preparation for selecting a channel to the register on primary switch 7.

*Channel selection and operation*

Having identified the location of the calling line as frame 9 primary switch 0 and now selecting an idle register on frame 9 primary switch 7, the marker can proceed to select an idle channel for interconnecting the line with the selected register. Since the circuits to be connected are on different primary switches of the same frame, they can advantageously be connected by selecting an idle link serving each of their respective primary switches and connecting the idle links at a common junctor switch horizontal exclusive of a junctor serving another frame.

With relay 4LSW0 operated on the network frame, the sleeve conductors of links 900–909 serving primary switch 0 are extended over conductors LLS0–LLS9 in cable 4–13 to the windings of test line link relays 13TLL0–13TLL9 in the marker. If any of these links are busy, their sleeves will be marked by ground to operate the corresponding test line link relays in the marker. Similarly, with relay 4TSW7 operated on frame 9, the sleeve conductors of the links 970–979 serving primary switch 7 are extended over conductors TLS0–TLS9 in the same cable to the windings of test trunk link relays 13TTL0–13TTL9 in the marker, and if any of these links are busy they will also be marked with ground on their sleeves to operate their corresponding trunk test link relays.

Relay 5JG9 on frame 9 is operated in the same manner as described in the previous call to extend the sleeves of ten junctors over test conductors JS0–JS9 in cable 5–13 to the windings of junctor test relays 13TJ0–13TJ9. It will be noted, however, that although relay 10SAF was operated indicating to the marker that the line and register are on the same frame, relay 12SAS will be normal, since the line and register are on different primary switches thereby permitting the junctor sleeves to be tested by the 13TJ– relays. Although a junctor will not be needed for this call, if a junctor serving another frame is connected to the horizontal to be used, the idle condition of the horizontal can be ascertained by testing its associated junctor sleeve.

It should also be noted that the particular horizontals selected for use on this call do not have junctors connected thereto and can advantageously be used for the intraframe connection being described. The number of horizontals that do not have junctors connected to them will depend on the number of network frames in the system and the size of the junctor switches used. Of course, it should be realized that the horizontals connected to other frames over junctors can also be used for an intraframe connection. Under these circumstances the junctor connected thereto, although not used, will be made busy, but no crosspoints will be closed on the other frame which the junctor serves.

For this example, let it be assumed that at least one component of each channel except channel 9 is busy. Under this assumption a 13TTL–, 13TJ– or 13TLL– relay will be operated for all channels except channel 9, and ground will be extended from CHT timer 1300 to operate relay 13CH9 in the marker. Contacts 1 of relay 13CH9 extend ground from contacts 10 of relay 10ON, over conductor CH9 in cable 4–13 to operate relay 4CH9 on frame 9.

With relays 4CH9 and 4LSW0 operated on frame 9, battery for operating the primary switch select magnet on switch 0 is extended through operated switch 13S2 in the marker, through normal contacts 5 of relay 13CH0 and other 13CH– relays (not shown), through operated contacts 4 of relay 13CH9, contacts 12 of relay 10ON and through marker equipment (not shown), over conductor LL9 in cable 4–13, through contacts 24 of relay 3MCA, contacts 2 of relay 4CH9, contacts 20 of relay 4LSW0 and through the winding of select magnet 4PSM09 operating that select magnet associated with link 909 serving the primary switch on which the calling line is located. The same ground is extended over conductor 401, through contacts 30 of relay 4TSW7 and through the winding of select magnet 4PSM79 to ground operating select magnet 4PSM79 associated with link 979 serving primary switch 7 on which register 1 is located.

In addition, battery from operated switch 13S1 is extended through contacts 2 of relay 13CH0 and through normal contacts of other 13CH– relays (not shown), through contacts 3 of relay 13CH9, through normal contacts 4 of relay 10SAF and over conductor JL9 in cable 5–13 to FIG. 5, through contacts 34 of relay 3MCA, contacts 1 of relay 4CH9, over conductor 500, through contacts 20 of relay 5JG9 and through the winding of junctor select magnet 5JSM99 to operate that select magnet which is associated with a horizontal having no junctor connected thereto.

With a select magnet operated on each primary switch and a select magnet operated on a junctor switch common to selected links 909 and 979, the marker can proceed to operate the various hold magnets to close the corresponding crosspoints and establish the selected channel.

Switch 14S1 in the marker is operated, as in the previous example, to extend to ground over conductor SO in cable 3–14, through contacts 12 of relay 3MCA, over conductor 302, conductor 315, through contacts 7 of relay 3F1, over sleeve conductor 313 and through the winding of hold magnet 4PHM70 to battery operating that hold magnet associated with register 1 and closing crosspoints 107. With crosspoints 107 closed, the ground on conductor 313 is extended over sleeve conductor 402 of link 979 and through the winding of junctor hold magnet 5JHM97 to battery, operating the latter hold magnet and closing crosspoints 105.

With the register hold magnet on primary switch 7 and the hold magnet associated with link 979 operated on junctor switch 9, the marker can proceed to operate the line hold magnet and the hold magnet on junctor switch 9 associated with the other selected link. The circuit for operating the line hold magnet is represented by switch 14S2 operated to close its contacts 1 which extends ground over conductor L9 to operate line hold magnet 4PHM09 as in the prior example. The operation of line hold magnet 4PHM09 closes crosspoints 117, and the ground on sleeve conductor 305 is then extended over conductor 413 of link 909 and through the winding of junctor hold magnet 5JHM90 to battery, operating that hold magnet associated with link 909 and closing crosspoints 106.

The operation of line hold magnet 4PHM09 disconnects the line relay 2L from the subscriber line, and with both junctor hold magnets operated the channel connection has been established, and a continuous path of tip ring and sleeve conductors has been extended from the trunk appearance on vertical O, of primary switch 7, through crosspoints 107, over link 979 to junctor switch 9, through crosspoints 105, over horizontal 9 of junctor switch 9, through crosspoints 106, over link 909 and through crosspoints 117 to the subscriber's line termination on vertical 9 of primary switch 0.

The marker then proceeds to make a continuity test of the channel, and if the channel is satisfactory for service, switch 14S1 is released and switch 14S2 is operated to its alternate position closing its contacts 2 to facilitate a double connection test. If no false ground from another channel is present on the sleeve of the channel being used, relay 14DCT operates to release relay 3F1 associated with register 1, and the release of relay 3F1 extends with tip, ring and sleeve connection to the register circuit thereby transmitting dial tone to the subscriber and permitting the subscriber at station 100 to assume control of the register.

When station 100 is connected through to register 1 and the subscriber assumes control of register 1, relay 2S2 in the register operates to extend the ground over the sleeve of the channel to shunt down relay 14DCT, and with relay 14DCT released and relay 13DCT1 operated, the marker proceeds to release by the operation of disconnect relay 13DIS1 as in the previous example.

Thus, the marker in not finding an available register on the same switch as the calling line, has selected an available register on the same network frame and connected the line and register within the frame the connection being exclusive of junctors or outlets serving other frames.

If, however, there were no available idle registers on the frame having the line requesting service, the marker would attempt to select an idle register on a different frame and connect the register to the line using the appropriate links on each frame and a junctor between the two frames as described in the example which follows.

*Selection of an idle register on a different network frame*

For purposes of illustration, let it be assumed that a customer at station 100 has initiated a dial tone call and that all of the registers located on the frame serving station 100 are busy but that registers on other frames, such as register 2 on frame 0, are idle.

When the customer at station 100 initiates the call, the marker is seized by frame 9, through marker connector 9, and the dial tone route relay 10RR0 is operated in the marker. The marker identifies the location of the calling line as being frame 9, primary switch 0, vertical 9 and then proceeds to test for an idle register on an idle frame as in the prior examples.

It will be recalled from the previous description that when dial tone route relay 10RR0 operated, it operated frame connecting relay 10FC0 to extend a trunk test lead (RF–) from each frame to the marker for the purpose of testing the idle condition of the registers on all frames. If it is assumed that register 0 and 1 on frame 9 are busy, but that register 2 on frame 0 is idle, ground is extended through normal contacts 2 of relay 6F1 associated with register 2, over conductor RF0 in cable 6–10 to FIG. 10, through contacts 1 of relay 10FC0, contacts 1 of relay 13FB0, contacts 1 of relay 10TFE, over conductor 1008 and through the winding of relay 10TF0 to battery operating relay 10TF0 and indicating to the marker that there is an idle register on frame 0. Relay 10TF0 locks over a circuit traced from battery through its winding, through its contacts 1 and through normal contacts 2 of relay 10TF9 to conductor 1010 and to ground over the previously traced locking circuit for relay 10LF9. Relay 10TF0, in operating, operates relay 10TFA which releases relay 10TFE to disconnect the RF– test leads from the windings of their corresponding 17TF– relays in the marker, thereby releasing all 10TF– relays except 10TF0 had any other 10TF– relays been operated indicating idle registers on the other frames.

Relay 10TFA, in operating, also opens its contacts 2 to release relay 11F0 to begin a sequence of operations for connecting the marker to the two frames, one having the register and the other frame having the calling line terminated thereon. Relay 11F0 in releasing, closes its contacts 1 to extend ground in FIG. 11 through normal contacts 6 of relay 10LF0, through operated contacts 5 of relay 10TF0 and through the winding of relay 11TFF to battery, operating relay 11TFF to indicate to the marker that the frame having the idle register should be seized first. It should be noted here, that under certain circumstances the marker will first seize the frame having the idle outgoing circuit (i.e., by operating the trunk frame first relay 11TFF), and under other circumstances the marker will first seize the frame having the incoming circuit requesting service (i.e., by operating the line frame first relay 11LFF). This is to prevent two markers from engaging in a mutual lockout condition wherein each of the markers has selected a frame and desires to select the frame held by the other marker. In systems such as that disclosed in the aforementioned Busch patent where connections are always made between line link and trunk link frames, the frames are always selected in the same order by all markers, and subsequent markers are only locked out while the prior marker is working in the frame.

Since a network frame in the instant disclosure can function both as a "line link" frame and as a "trunk link" frame, I have incorporated circuitry in my invention to alter the order of frame selection to prevent mutual lockout.

To illustrate a mutual lockout situation, let it be assumed that subscriber 100 on "line link" frame 9 has initiated an outgoing call and has been connected (via its register marker connector) to a first marker which ascertains that the only available outgoing trunk in the proper route is trunk 115 located on "trunk link" frame 0. If trunk link frames are always seized first as in the Busch disclosure, the first marker will first seize "trunk link" frame 0 and then attempt to seize "line link" frame 9 having the calling line. Let it further be assumed that a second marker has simultaneously received a dial tone request from subscriber 117 on frame 0 (now functioning as a "line link" frame) and ascertains that the only available register is located on frame 9 which functions as a "trunk link" frame for this call. If the second marker seizes its "trunk link" frame first, it will seize frame 9 and then attempt to seize frame 0 containing the calling line 117. Under these assumed conditions wherein each marker seizes a "trunk link" frame first, the first marker will hold frame 0 (the "trunk link" frame for its call) busy and wait for frame 9 to become idle, while the second marker will be holding frame 9 (its "trunk link" frame) busy while waiting for the first marker to release frame 0. With each marker waiting for the other to relinquish its frame, both markers will time out and release their respective connections without satisfactorily completing the calls.

In accordance with one feature of my invention the marker will alter the order of selection of frames based on the identity of the frames to be selected.

For example, under the assumed conditions the first marker will have its 10LF9 and 10TF0 relays operated indicating a connection between "line link" frame 9 and "trunk link" frame 0, respectively, is desired. With these relays operated this marker will attempt to seize frame 0 first by operating relay 11TFF in FIG. 11. The other marker, however, will have its 10LF0 and 10TF9 relays operated indicating a connection between the same frames, but on this call, frame 9 functions as a "trunk link" frame and frame 0 functions as a "line link" frame. With relays 10LF0 and 10TF9 in the second marker, its 11LFF relay will be operated directing the marker to seize its "line link" frame 0 first. Although both markers will simultaneously be directed to select the same frame (frame 0), only one marker will be permitted to operate its associated connector, and the other marker will be temporarily locked out by the frame connector preference circuit.

Returning now to the call being described, relay 11TFF in operating, closes its contacts 2 in FIG. 11 to extend ground through operated contacts 14 of relay 10TF0 and over conductor MP0 in cable 7–11, through the winding of relay 7MP and through normal contacts of other MP relays (not shown) to ground operating relay 7MP associated with frame connector 0. Relay 7MP, in operating, closes an obvious operating circuit for multicontact relay 7MCA which operated to associate frame 0 with the marker. Relay 7MCA closes its contacts 18 in FIG. 8 and extends ground over conductor CK0 to FIG. 12, through contacts 9 of relay 10TF0 and through the winding of relay 12CKT to battery. Relay 12CKT operates over this circuit indicating to the marker that the frame having an idle register has been seized and associated with the marker via its connector.

Having seized the frame containing an idle register, the marker now proceeds to seize the frame containing the calling line. Ground is extended through normal contacts 5 of relay SCF in FIG. 11, through contacts 4 of relay 12CKT, contacts 3 of relay 11TFF, normal contacts 1 of relay 11LFF, through normal contacts 7 of relays 10LF0, 10LF1 and other 10LF– relays (not shown), through operated contacts 8 of relay 10LF9, over conductor MP9 in cable 3–11 to FIG. 3, through the winding of relay 3MP and through contacts of other MP relays (not shown) to ground operating relay 3MP. Relay 3MP operates to complete an obvious circuit for operating its multicontact relay 3MCA to associate the marker with frame 9. Relay 3MCA, in operating, also closes its contacts 18 to extend ground over conductor CK9 to the marker to operate relay 12CKL indicating to the marker that the frame having the calling line has been seized.

It will be noted at this point that the frame having the idle register is different from the frame having the calling line, and therefore, relay 10SAF will not operate indicating to the marker that the circuits to be connected are on different frames. With relays 12CKL and 12CKT operated, however, ground is extended through their contacts 2, through operated contacts 11 of relay 10TF0 and over conductor TF0 in cable 8–13 to FIG. 8, through contacts 17 of relay 7MCA and through the winding of relay 8TF0 to battery operating relay 8TF0 on frame 0 to facilitate the subsequent selection of an idle register and channel thereat. Relays 12CKL and 12CKT also close their contacts 3 to extend ground through normal contacts 12 of relays 10LF0, 10LF1 and other 10LF– relays (not shown), through contacts 11 of relay 10LF9 and over conductor LF9 in cable 4–13 to FIG. 4, through contacts 16 of relay 3MCA and through the winding of relay 4LF9 on frame 9 operating relay 4LF9 to facilitate subsequent channel testing on frame 9.

As with the priorly described call, marker route relay 10RR0 operates a twenty-block relay (TB–) and a trunk group connecting relay (TG–) on the frame containing the idle register. For this call, this would result in the operation of relays 7TB0 and 7TG0 on frame 0 which extend to the marker the idle test circuits for those registers on frame 0 of the proper type.

Only one register, register 2, has been shown on frame 0, and the idle test circuit for that register can be traced from battery through the lower winding of relay 11T0 in the marker, through contacts 2 of relay 11TE, over conductor T0 in cable 7–11, through contacts 3 of relay 7MCA, over conductor 700, through contacts 1 of relay 7TB0, through the winding of relay 7F0 associated with register 2, through normal contacts 3 of relay 6S1, through contacts 1 of relay 7TG0, over conductor 701, through contacts 7 of relay 7MCA, over conductor TS7 in cable 7–11 to FIG. 11, through FIG. 11 to FIG. 12, through operated contacts 1 of relay 12TSE and through the high resistance upper winding of relay 12TSW7 to ground. Relay 12TSW7 operates over this circuit, but relays 7F0 associated with the register and 11T0 in the marker do not operate at this time.

Relay 12TSW7 locks over a circuit traced from battery through its lower winding, through its contacts 6, through normal contacts of relays 12TSW6–12TSW2 (not shown), through normal contacts 7 of relays 12TSW1 and 12TSW0 to ground over conductor 1206 from the previously traced locking circuit for relay 12LSW0. The operation of relay 12TSW7 causes relay 12TSA to operate, and relay 12TSA releases relay 12TSE. With relays 12TSE released and 12TSA operated relay 12TSG operates to extend a low resistance ground over conductor TS7 to operate relay 7F0 associated with register 2 and relay 11T0 in the marker. Relay 7F0 extends a number of circuits from the register to the marker for subsequent channel testing and prepares register 2 for the reception of the calling line location information. Relay 7F0 also completes a circuit from ground in the marker over conductor S1 to operate relay 6S1 in the register and make the register busy.

Figure 8:
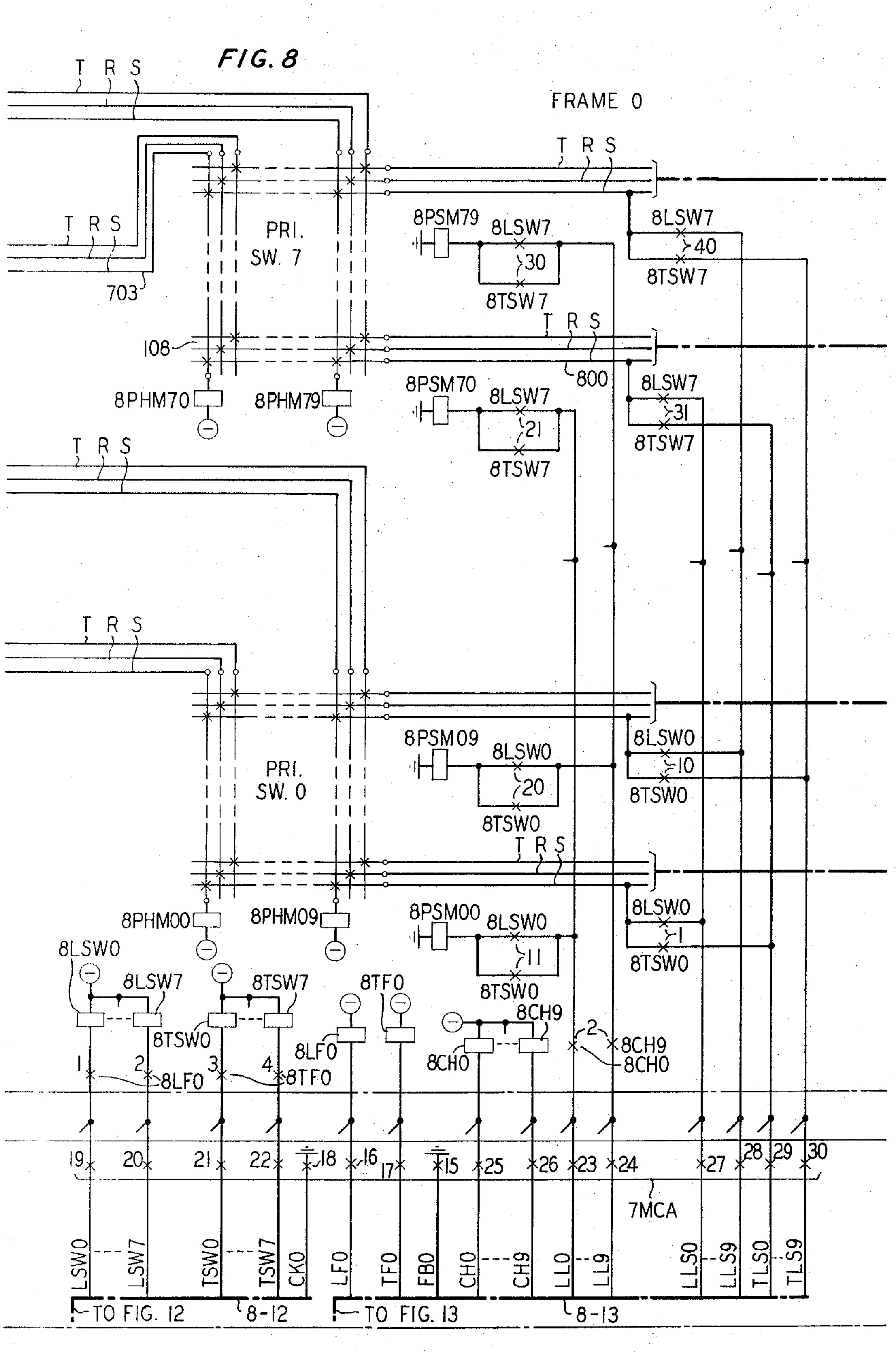
Figure 9:
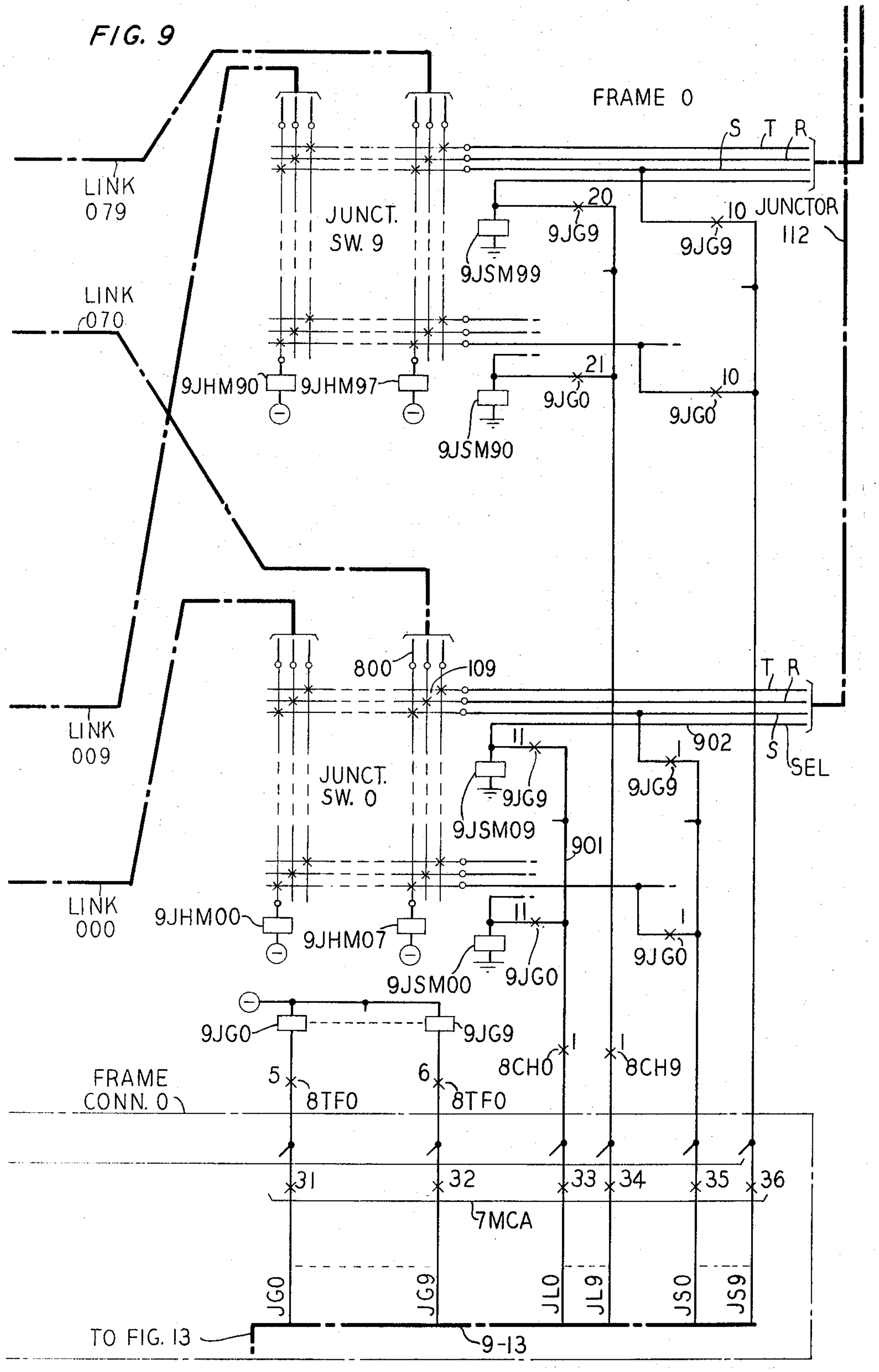

Relay 12TSG, in operating, also extends ground through its contacts 2 in FIG. 12, through normal contacts 6 of relay CF, through normal contacts 14 of relays 12TSW0, 12TSW1 and 12TSW– (not shown), through contacts 15 of relay 12TSW7, over conductor TSW7 in cable 8–12 to FIG. 8, through contacts 22 of relay 7MCA, contacts 4 of relay 8TF0 and through the winding of relay 8TSW7 to battery operating relay 8TSW7.

It will be recalled from the previous example that a TSW– relay on a network frame extends to the marker the sleeves of the links serving a particular primary switch having the trunk idle register circuit thereon. In the example being described, the sleeves of links 070–079 will be extended over conductors TLS0–TLS9 in cable 8–13 to the windings of test trunk link relays 13TTL0–13TTL9, and if any of these links are busy their sleeves will be marked by ground to operate the corresponding test trunk link relays in the marker.

Relay 4LSW0 associated with frame 9 will have also been operated at this time in the manner described for the previous call, and relay 4LSW0 extends to the marker the sleeve conductors of links 900–909 which serve primary switch 0 on frame 9. These sleeves are extended to the windings of test line link relays 13TLL0–13TLL9, and if any of these links 900–909 are busy their sleeves will be marked with ground, accordingly, to operate the corresponding test line link relays in the marker.

With relay 8TF0 on frame 0 operated and relay 10LF9 in the marker operated a circuit is completed from ground on contacts 7 of relay 10ON in FIG. 13, through contacts 11 of relay 10LF9, over conductor JG9 in cable 9–13, through contacts 32 of relay 7MCA, contacts 6 of relay 8TF0 and through the winding of relay 9JG9 to battery operating junctor group cut-in relay 9JG9. Relay 9JG9, in operating, closes its contacts 1–10 to extend to the marker the ten sleeve leads of the junctors interconnecting frame 0 with frame 9. These sleeves are extended over conductors JS0–JS9 in cable 9–13 to the windings of test junctor relays 13TJ0–13TJ9, and if any of the junctors are busy their sleeves will be marked with ground, accordingly, to operate corresponding test junctor relays in the marker.

At this point in the call the marker is ready to select an idle channel. As mentioned above, the testing and selecting of an idle channel is similar to that described in Patent 2,585,904 granted to Busch of February 19, 1952 and need not be described in detail herein for a complete understanding of my invention. For purposes of illustration, let it be assumed that all channel components are idle and, therefore, all 13TJ–, 13TL– and 13TLL– relays will be released. The channel is then selected upon the operation of CHT timer 1300 which, in the assumed example, will operate relay 13CH0 associated with channel 0. Relay 13CH0 in the marker operates to extend ground over conductor CH0 in cable 8–13 to frame 0 and conductor CH0 in cable 4–13 to frame 9 through contacts 25 of relays 7MCA and 3MCA in the respective frame connectors and through the windings of relays 8CH0 and 4CH0, respectively, to battery operating relay 8CH0 on frame 0 and relay 4CH0 on frame 9.

*Channel operation*

After the selection of an idle channel or connecting path has been completed, the marker will proceed to establish the selected channel by operating the appropriate select magnets and hold magnets. The operating circuit for the select magnets on the primary switches associated with the calling line on frame 9 and register circuit 1 on frame 0 are represented by a circuit traced from battery in the marker, through the operated switch 13S2, through contacts 4 of relay 13CH0, contacts 11 of relay 10ON, through marker equipment (not shown) and over conductor LL0 in cables 4–13 and 8–13 to frames 9 and 0, respectively. The ground on conductor LL0 in cable 4–13 is extended through contacts 23 of relay 3MCA, contacts 2 of relay 4CH0, contacts 11 of relay 4LSW0 and through the winding of select magnet 4PSM00 to ground operating that select magnet on the primary switch serving the calling line. The ground on conductor LL0 in cable 8–13 is extended through contacts 23 of relay 7MCA, contacts 2 of relay 8CH0, contacts 21 of relay 8TSW7 and through the winding of select magnet 8PSM70 to ground operating select magnet 8PSM70 on primary switch 7 of frame 0 which has register 2 terminated thereon.

A circuit is also closed for operating the junctor select magnets associated with junctor 112 between frame 0 and 9. This circuit can be traced from battery in FIG. 13 of the marker, through operated switch 13S1, through operated contacts 3 of relay 13CH0, through normal contacts 3 of relay 10SAF or 12SAS, over a conductor JL0 in cable 9–13 to FIG. 9, through contacts 33 of relay 7MCA, contacts 1 of relay 8CH0, over conductor 901, through contacts 11 of relay 9JG9 and through the winding of junctor select magnet 9JSM09 to ground operating that junctor select magnet on junctor switch 0 of frame 0. The same battery is also extended from contacts 11 of relay 9JG9 over conductor 902 of junctor 112 and through the winding of junctor select magnet 5JSM00 to ground, operating that junctor select magnet on junctor switch 0 of frame 9 which is associated with the other end of junctor 112.

Having operated select magnets on the primary switches of the calling line and of the selected register and also those select magnets on the junctor switches associated with junctor 112 serving both the calling line and the selected register, the marker can now proceed to close the appropriate hold magnets to establish a channel between the calling line and register 2. Switch 14S1 in FIG. 14 will be operated at this time to extend ground over conductor S0 in cable 7–14, through contacts 12 of relay 7MCA, over conductor 702, through contacts 7 of relay 7F0 associated with register 2, over conductor 703 and through the winding of hold magnet 8PHM70 to battery, operating that hold magnet associated with register 2 and closing crosspoints 108. The ground on conductor 703 is then extended through crosspoints 108 and over conductor 800 of link 070 to FIG. 9 and through the winding of junctor hold magnet 9JHM07 to battery operating the latter junctor hold magnet and closing crosspoints 109.

A similar circuit is completed for operating the line hold magnet. This circuit can be traced from ground through switch 14S2 operated to close its contacts 1, over conductor 1301, through contacts 15 of relay 10DT, contacts 5 of relays 11L0, 11L1, and other 11L– relays (not shown), through contacts 4 of relay 11L9 and over conductor L9 in cable 3–14 to FIG. 3, through contacts 13 of relay 3MCA, over conductor 314, through contacts 21 of relay 4LSW0, over conductor 305 and through the winding of line hold magnet 4PHM09 to battery, operating the line hold magnet and closing crosspoints 103. The ground for operating the line hold magnet is then extended through crosspoints 103, over conductor 403 of link 900 to FIG. 5 and through the winding of junctor hold magnet 5JHM00 to battery, operating the latter junctor hold magnet and closing crosspoints 110.

With the line hold magnet on frame 9, the register hold magnet on frame 0 and junctor hold magnets on both frames 0 and 9 operated, the channel connection has been established, and the marker can proceed to make a continuity test to ascertain that all crosspoints of the selected channel are closed and that a continuous pair of tip and ring conductors is extended from the register appearance to the subscriber line. After making a successful continuity test, the marker performs a test to assure that no double connection exists, and this is accomplished in the circuit described herein by releasing switch 14S1 and operating switch 14S2 to its alternate position to close its contacts 2. If the channel is free of a double connection, relay 14DCT will operate to operate relay 13DCT1 and also to open the operating circuit for relay 7F0 associated with register 2. Relay 7F0 in releasing extends the subscriber line over the established channel to the register circuit permitting the subscriber at station 100 to assume control of the register. With the customer a station 100 holding register 2 operated, ground is extended from contacts 1 of relay 6S1 in register 2, back over the sleeve of the channel to shunt down relay 14DCT in the marker to inform the marker that control of the connection has been satisfactorily transferred to the subscriber. Relay 14DCT releases, and with relay 13DCT1 operated, a circuit is completed for operating marker disconnect relay 13DIS1 to disconnect the marker from frames 0 and 9 leaving subscriber line circuit 101 connected through crosspoints 103, over link 900 through crosspoints 110, over junctor 112, through crosspoints 109 over link 070 and through crosspoints 108 to register 2.

Thus it can be seen that although no idle register circuits were available for connection to the calling line within the same frame, the line is not precluded from connection to an idle register since registers associated with other frames are readily available for connection over the appropriate links and junctors.

In the examples described above in detail, a local customer had originated a request for dial tone, and this resulted in the operation of marker relays 10DT, 10DTA, etc. indicating to the marker that a dial tone class of call was to be served. Of course, it will be understood that the invention is suitably adapted for use in serving other types of calls. While a detailed description of these other calls need not be given herein for a full understanding of the invention, some of these calls will now be described briefly showing how certain features of the invention are applicable.

*Subscriber outgoing call to a distant exchange*

When a register has received a full complement of digits representing the called number, the register seizes the marker through a register marker connector, such as register marker 114 in FIG. 10, and transmits to the marker the information as to the location of the calling line plus the called number. The marker then translates the office code of the called number, and if it ascertains that the called number is served by a distant office, class of call relay SOG is operated in the marker indicating that a subscriber outgoing call is to be served and permitting the calling line location information to be registered in the marker. To simplify the disclosure, only certain of the contacts of relay SOG have been shown, and it will be understood that this relay performs the same functions as similar class relays found in the aforementioned Busch patent.

With this information the marker operates a route relay for the proper group of outgoing trunks, and over RF– leads, the marker identifies those trunk frames having idle trunks in the desired group. If it is assumed that the called number is located at a distant exchange, such as exchange B in FIG. 6, trunks such as trunk 115 will be tested, and the marker, using the line location information of the calling line, will prefer the selection of a trunk on the same frame and primary switch as the calling line in the same manner that the marker preferred the selection of registers on a dial tone call. In general, the operation of an outgoing call is similar to the operation of a dial tone call except that the marker will make sure that a channel is available before releasing the channel used on the dial tone connection to assure that at least one channel is available to the calling line.

*Incoming call from a distant exchange*

When a call is to be received from a distant exchange an incoming trunk such as trunk 116 is seized from the distant exchange, and a register is connected to the trunk in the same manner that a calling line is connected to a register on a dial tone call. When the register connected to the incoming trunk has received the called number from the distant exchange, it seizes a marker through register marker connector 114 and passes to the marker the called number and the location of the incoming trunk. If the called number is in the local office, the marker operates relay TER indicating that a terminating call is to be served and stores the location of the incoming trunk on the 10TF–, 12TSW–, and 11LC– relays and passes the called number to number group 113 for translation. Number group 113 in FIG. 10 translates the called number into location information for the called line which comprises the frame number, the primary switch number and the particular line on that switch. The called line location information from the number group is then registered on the 10LF–, 12LSW– and 11L– relays in the marker and channel test and switch operation proceeds in the same manner as on other calls.

If the called number received over the incoming trunk is located at a distant exchange, the marker proceeds like on a terminating call up to the point where the marker translates the called number and ascertains that it is for a distant office rather than for a local office. The marker then operates tandem outgoing class of call relay TOG indicating that this office will now serve as a tandem office by switching the incoming trunk through to an outgoing trunk serving the distant office. After operating the appropriate route relay the marker then attempts to select a trunk in the proper route giving preference to those trunks located on the same frame and primary switch as the incoming trunk in the manner heretofore described with respect to a dial tone call.

*Local call*

On intraoffice calls originating and terminating in the same local office, an intraoffice trunk is used. While I have not shown an intraoffice trunk in the drawing, an intraoffice trunk has two primary switch appearances similar to the intraoffice trunk in the above-identified Busch patent. One appearance, for connection to the calling line, is like an outgoing trunk, and the other appearance, for connection to the called line, is similar to an incoming trunk.

Marker operation on the "call back" stage of the call (i.e., establishing the connection between the calling line and the trunk) is similar to that described with respect to a dial tone call or an outgoing call, and the marker selects an intraoffice trunk through the operation of an intraoffice route relay and the associated TB–, TG– relays on a frame. On the call back portion of an intraoffice call class relay CB in the marker would be operated, and although this relay has not been shown in the drawing, its contacts have been shown in certain of the marker circuitry heretofore described. After the call back connection is established by connecting the calling subscriber with one appearance of the intraoffice trunk, the marker operates the start call forward and call forward (SCF and CF) relays to establish the "call forward" connection from the other appearance of the intraoffice trunk to the location of the called subscriber, the called subscriber location having been ascertained from the number group circuit.

On the call back portion of the call the marker identified the intraoffice trunk selected by the operation of an 11T– relay, and this relay will remain operated on the call forward portion of the call so that the marker can remember which trunk is being used and thereafter operate the appropriate F– relay associated with the call forward portion of the intraoffice trunk.

While the elements essential for a full understanding of the invention have been disclosed herein, it will be understood that other common control equipment, test equipment, message billing equipment, etc. may also be provided in the system; however, since this equipment is so well known in the prior art, a further disclosure or description need not be given herein for the reader to fully appreciate the features of my invention.

It is to be understood that the above-described arrangements are merely illustrative of the application of the principles of the invention. Numerous other arrangements may be devised by those skilled in the art without departing from the spirit and scope of my invention.

What is claimed is:

1. In a switching system, a plurality of incoming circuits divided into groups, a plurality of outgoing circuits divided into corresponding groups, switching means for interconnecting any incoming circuit with any outgoing circuit, identifying means responsive to a service request signal on one of said incoming circuits for identifying the particular group containing said one incoming circuit requesting service, and means governed by said group identifying means for selecting an idle one of said outgoing circuits in accordance with the particular identity of said identified group and for directing said switching means to interconnect said one incoming circuit with said selected outgoing circuit entirely within said identified group.

2. The invention defined in claim 1 wherein each said circuit group comprises a plurality of subgroups of incoming circuits, wherein said group identifying means includes means for identifying the particular subgroup containing said incoming circuit requesting service, and wherein said circuit selecting means includes means directed by said subgroup identifying means for selecting one of said outgoing circuits in accordance with the particular identity of said identified subgroup for directing said switching means to interconnect said one incoming circuit with said selected outgoing circuit entirely within said identified subgroup.

3. The invention defined in claim 2 wherein said circuit selecting means includes means effective when said outgoing circuits in said identified group and subgroup are unavailable, for directing said switching means to interconnect said one incoming circuit with any available outgoing circuit in a group and subgroup other than said identified ones.

4. In a switching system, subnetworks each comprising calling and called circuits and primary switch means for interconnecting said circuits within said subnetwork; networks each comprising a different plurality of said subnetworks and secondary switch means for interconnecting the subnetworks of a said network; means for coupling the subnetworks of different networks; means responsive to a service request signal on one of said calling circuits for identifying the subnetwork and network of said requesting circuit, for selecting an available called circuit in said identified subnetwork and for actuating said primary switch means to interconnect said requesting circuit with said selected called circuit; means responsive to the unavailability of a called circuit in said identified subnetwork for selecting an available called circuit in one of said other subnetworks of said identified network and for actuating said secondary switch means to interconnect said requesting circuit with the selected called circuit of said other subnetwork; and means responsive to the unavailability of a called circuit in said identified network for selecting an available called circuit in one of said other networks and for actuating said coupling means to interconnect said requesting circuit with a called circuit of said other network.

5. A switching network comprising primary switch means divided into groups and having incoming and outgoing circuits terminated thereon; secondary switch means divided into corresponding groups; link means interconnecting said primary and secondary switch means within a group; junctor means interconnecting said secondary switch means of different groups; means including said primary switch means and exclusive of said link means for interconnecting incoming and outgoing circuits terminated on said primary switch means; means including said link means, said secondary switch means and exclusive of said junctor means for interconnecting incoming and outgoing circuits in one of said groups; and means including said link means and said junctor means for interconnecting incoming and outgoing circuits in different ones of said groups.

6. In combination, a plurality of primary switching networks each having lines terminated therein, a plurality of secondary networks each comprising different ones of said primary networks and switch means, means coupling said secondary networks to each other, control means common to said networks and responsive to a calling one of said lines requesting service to a called one of said lines for indicating the particular primary and secondary network of said calling line requesting service, said control means including means for selecting called lines available for connection to said calling line in a preferential order beginning with the called lines terminated in said calling line primary network, means effective when the called lines terminated in said calling line primary network are unavailable for selecting other called lines terminated in said calling line secondary network, means effective when said other called lines terminated in said calling line secondary network are unavailable for selecting still other called lines terminated in secondary networks other than said calling line secondary network, and means effective when an available called line is selected for actuating said switch means and said coupling means in accordance with the network termination of said calling line and said selected available called line.

7. A communication system comprising a plurality of frames including primary switches having lines terminated thereon and secondary switches, links individual to each said frame for interconnecting said primary and secondary switches thereat, junctors interconnecting said secondary switches of different frames, means for controlling said links and junctors for interconnecting said lines for communication, means responsive to a calling one of said lines requesting connection to any line in a called group of said lines for identifying the frame and primary switch termination of said calling line, test means for ascertaining the availability of lines in said called line group, means responsive to said test means for identifying the frame and primary switch terminations of available called lines, and circuit means effective when both the frame and primary switch identity of said calling line match the frame and primary switch identity of an available one of said called lines for directing said control means to interconnect said calling line with said available called line at said primary switches and exclusive of said links and junctors.

8. The invention defined in claim 7 wherein is also provided second circuit means effective when only the frame identity of said calling line matches the frame identity of an available one of said called lines for directing said control means to interconnect said calling line with said available called line at said secondary switches and including said links.

9. The invention defined in claim 8 wherein is also provided third circuit means effective when said calling line frame and primary switch termination identity differs from an available called line frame and primary switch termination identity for directing said control means to interconnect said calling line with said available called line over said links and said junctors.

10. A communication system comprising a plurality of networks comprising primary switches having incoming and outgoing lines terminated thereon and secondary switches, links interconnecting said primary and secondary switches of the same network, junctors interconnecting secondary switches of different networks, control means responsive to a service request signal on a calling one of said incoming lines for controlling said links and junctors to interconnect said calling line with any one of said outgoing lines, means for identifying the network and primary switch termination of said calling line, testing means for ascertaining the availability of said outgoing lines, means jointly controlled by said identifying means and said testing means for selecting an outgoing line having the same network and primary switch identity as said calling line, and means responsive to said selecting means for directing said control means to interconnect said calling line requesting service with said selected outgoing line independently of said links and said junctors.

11. In a communication system, primary switching networks each comprising a plurality of lines terminated therein, primary outlets and switch means for interconnecting said lines and said primary outlets; a second switching network for interconnecting said primary outlets of different primary networks; means responsive to a request for service from a calling one of said lines to others of said lines for identifying the network termination of said calling line; test means for identifying the network terminations of available ones of said other lines; means effective when said calling line and an available other line are terminated in the same primary network for controlling said switch means to interconnect said calling line with said available line at only said switch means; and means effective when said calling line and an available other line are terminated in different primary networks for interconnecting said calling line with said available other line over said second network, 12. In a telephone switching system, a plurality of line frames each comprising primary crossbar switches each having lines terminated on the verticals thereof; secondary crossbar switches on each said frame: links terminated on the verticals of said secondary switches and on the horizontals of said primary switches of the same line frame; junctors interconnecting horizontals of secondary switches in different line frames; a calling line; a plurality of called lines terminated on verticals of different primary switches of different line frames; and control means responsive to a service request signal on said calling line for selecting on a preferential basis an available called line for connection thereto, said control means comprising means for identifying the line frame and primary switch termination of said calling line, means for ascertaining the identity of line frames having available called lines and for selecting in order one of said line frames beginning with the line frame of said calling line, means for ascertaining the primary switch identity of available called lines in said selected line frame and for selecting in order one of said available called lines beginning with a called line terminated on said calling line primary switch, means effective when a first one of said selected called lines is both of the same line frame and same primary switch as said calling line for interconnecting said first selected called line with said calling line including means for actuating a primary switch horizontal and the corresponding verticals of said calling and said first selected called line, means effective when a second one of said selected called lines is only of the same line frame as said calling line for interconnecting said second selected line with said calling line by actuating a secondary switch horizontal and verticals corresponding to links coupling said calling line primary switch and said second called line primary switch to said secondary switch, and means effective when a third one of said selected called lines is of a line frame other than said calling line for interconnecting said third selected called line and said calling line using a link on each said line frame interconnected by one of said junctors.

13. In a telephone system, a plurality of line groups comprising lines and switch means for interconnecting said lines; line identifying means responsive to a service request signal on a calling one of said lines for identifying the line group of said calling line; means for testing for the availability of line groups having lines available for connection to said calling line; preference means for ranking said line groups having available lines in a preferential order; means controlled by said line identifying means and said preference means for selecting that line group having both said calling line and a line available for connection thereto; and means controlled by said selecting means for actuating the switch means of said selected group for interconnecting said calling line with one of said available lines in said selected group.

14. The invention defined in claim 13 wherein each said line group further comprises subgroups of lines, each subgroup including different ones of said lines of said group; wherein each said switch means comprises primary switch means corresponding to each said subgroup and secondary switch means, said primary switch means being effective when actuated independently for interconnecting lines of its corresponding subgroup; wherein said line identifying means comprises means for identifying the subgroup of said calling line; wherein said test means comprises means for ascertaining the subgroups having lines available for connection to said calling line; wherein is also provided second preference means for ranking said subgroups having available lines in a preferential order; wherein said selecting means comprises means controlled by said subgroup identifying means, said first mentioned and said second preference means for selecting that subgroup having both said calling line and a line available for connection thereto; and wherein said actuating means comprises means for actuating only said primary switch means of said selected subgroup for interconnecting said calling line with one of said available lines in said subgroup.

15. The invention defined in claim 14 wherein means are provided for selecting a subgroup other than said calling line subgroup and having available lines therein; wherein each said secondary switch means comprises a plurality of secondary switches and links coupling said secondary switches with said primary switch means in a said line group; and wherein said actuating means comprises means for actuating said primary switch means and one of said secondary switches to interconnect over idle ones of said links said calling line of one subgroup with an available line in said other selected subgroup.

16. The invention defined in claim 15 wherein junctors are provided for coupling said secondary switches and are effective when idle for interconnecting lines of different line groups; wherein means are provided for testing the idle condition of said junctors; and wherein means are provided for simulating a junctor idle condition when a said interconnection is effected by the actuation of only said primary switch means.

17. The invention defined in claim 16 wherein first link test means are provided for ascertaining the idle condition of links coupled to said calling line subgroup, wherein second link test means are provided for ascertaining the idle condition of links coupled to said selected subgroup having an available line therein, and wherein said actuating means also comprises means effective when the selected subgroup contains both said calling line and a line available for connection thereto for connecting said first and second link test means to the links coupled to said calling line subgroup.

18. In a communication system, a plurality of frames each having lines terminated thereon and switch means for interconnecting said lines, said lines including a calling one of said lines and called lines, means responsive to a service request signal on said calling line for identifying a calling one of said frames having said calling line terminated thereon, means for ascertaining the availability of said called lines and for identifying a called one of said frames having one of said available called lines terminated thereon, means for selecting said calling and called frames in a variable order in accordance with the identity of said calling frame, and means governed by said selecting means for actuating said switch means to interconnect said calling and said available called line.

19. The invention defined in claim 18 wherein said selecting means comprises means for ranking said calling and called frame identities in a first order, means for selecting one of said identified frames in accordance with the relative rank of said calling and called frame identities, and means effective when said one frame is selected for selecting the other of said identified frames.

No references cited.

KATHLEEN H. CLAFFY, *Primary Examiner.*

WILLIAM C. COOPER, *Examiner.*